(12) United States Patent
Davis et al.

(10) Patent No.: US 8,038,971 B2
(45) Date of Patent: Oct. 18, 2011

(54) FUMED SILICA OF CONTROLLED AGGREGATE SIZE AND PROCESSES FOR MANUFACTURING THE SAME

(75) Inventors: Sheldon B. Davis, Nashua, NH (US); Angelica M. Sanchez Garcia, Somerville, MA (US); David M. Matheu, Somerville, MA (US); Yakov E. Kutsovsky, Arlington, MA (US)

(73) Assignee: Cabot Corporation, Boston, MA (US)

( * ) Notice: Subject to any disclaimer, the term of this patent is extended or adjusted under 35 U.S.C. 154(b) by 433 days.

(21) Appl. No.: 12/205,643

(22) Filed: Sep. 5, 2008

(65) Prior Publication Data

US 2010/0059704 A1 Mar. 11, 2010

(51) Int. Cl.
*C01B 33/18* (2006.01)
*C01B 33/14* (2006.01)

(52) U.S. Cl. ........... 423/337; 423/335; 423/336; 51/308

(58) Field of Classification Search .......... 423/335–337; 51/308
See application file for complete search history.

(56) References Cited

U.S. PATENT DOCUMENTS

| | | | |
|---|---|---|---|
| 2,631,083 A | 3/1953 | Engelson et al. |
| 2,693,406 A | 11/1954 | Wendell, Jr. et al. |
| 2,771,344 A | 11/1956 | Michel et al. |
| 2,773,741 A | 12/1956 | Antonsen |
| 2,780,525 A | 2/1957 | Wendell, Jr. et al. |
| 2,801,901 A | 8/1957 | Dingman et al. |
| 2,803,038 A | 8/1957 | Holland et al. |
| 2,828,186 A | 3/1958 | Dingman et al. |
| 2,829,949 A | 4/1958 | Wendell, Jr. et al. |
| 2,847,316 A | 8/1958 | Michel et al. |
| 3,006,738 A | 10/1961 | Wagner |
| 3,007,774 A | 11/1961 | Stokes et al. |
| 3,024,089 A | 3/1962 | Spencer et al. |
| 3,065,093 A | 11/1962 | Berstein et al. |
| 3,112,210 A | 11/1963 | Carpenter et al. |
| 3,130,008 A | 4/1964 | Stokes et al. |
| 3,166,542 A | 1/1965 | Orzechowski et al. |
| 3,203,762 A | 8/1965 | Carpenter |
| 3,205,177 A | 9/1965 | Orzechowski et al. |

(Continued)

FOREIGN PATENT DOCUMENTS

DE 199 55 456 A1 5/2001

(Continued)

OTHER PUBLICATIONS

Khan, et al. "Dynamic rheological behavior of flocculated fumed silica suspensions," J. Rheol. 37(6) (1993), pp. 1225-1235.*

(Continued)

*Primary Examiner* — Stanley Silverman
*Assistant Examiner* — Diana J Liao

(57) ABSTRACT

The invention provides fumed silica comprising aggregates that have an aggregate size and a surface area that satisfy particular formulas relating aggregate size to surface area, as well as aggregates that exhibit particular viscosity, power law exponent index, and/or elastic modulus characteristics when dispersed in liquid media. The invention also provides processes of preparing such fumed silica by combining a silica precursor with a stream of combustible gas, combusting the stream, and producing a stream of combusted gas and fumed silica particles, wherein dopants are introduced, the time/temperature profile, or history, of the stream of combusted gas and fumed silica particles is adjusted to allow for post-quench aggregate growth, and/or additional silica precursor is introduced into the stream of combusted gas.

38 Claims, 14 Drawing Sheets

U.S. PATENT DOCUMENTS

| | | |
|---|---|---|
| 3,205,178 A | 9/1965 | Orzechowski et al. |
| 3,212,911 A | 10/1965 | Berstein et al. |
| 3,322,499 A | 5/1967 | Carpenter et al. |
| 3,363,980 A | 1/1968 | Krinov |
| 3,365,274 A | 1/1968 | Carpenter et al. |
| 3,372,001 A | 3/1968 | Wendell |
| 3,406,228 A | 10/1968 | Hardy et al. |
| 3,455,653 A | 7/1969 | Aftandilian |
| 3,488,204 A | 1/1970 | Jordan et al. |
| 3,493,342 A | 2/1970 | Weaver et al. |
| 3,510,291 A | 5/1970 | Brush |
| 3,510,292 A | 5/1970 | Hardy et al. |
| 3,607,049 A | 9/1971 | Weaver, Jr. et al. |
| 3,619,140 A | 11/1971 | Morgan et al. |
| 3,639,100 A | 2/1972 | Rick |
| 3,663,283 A | 5/1972 | Hebert et al. |
| 3,922,335 A | 11/1975 | Jordan et al. |
| RE28,974 E | 9/1976 | Morgan et al. |
| 4,023,961 A | 5/1977 | Douglas et al. |
| 4,145,403 A | 3/1979 | Fey et al. |
| 4,822,410 A | 4/1989 | Matovich |
| 4,857,076 A | 8/1989 | Pearson et al. |
| 4,879,104 A | 11/1989 | List et al. |
| 4,937,062 A | 6/1990 | Jordan et al. |
| 5,075,090 A | 12/1991 | Lewis et al. |
| 5,147,630 A | 9/1992 | Reznek et al. |
| 5,152,819 A | 10/1992 | Blackwell et al. |
| 5,256,389 A | 10/1993 | Jordan et al. |
| 5,340,560 A * | 8/1994 | Rohr et al. ............... 423/337 |
| 5,447,708 A | 9/1995 | Helble et al. |
| 5,456,750 A | 10/1995 | Mackay et al. |
| 5,599,511 A | 2/1997 | Helble et al. |
| 5,614,472 A | 3/1997 | Riddle et al. |
| 5,698,177 A | 12/1997 | Pratsinis et al. |
| 5,876,683 A | 3/1999 | Glumac et al. |
| 5,904,762 A | 5/1999 | Mahmud et al. |
| 5,958,361 A | 9/1999 | Laine et al. |
| 6,086,841 A | 7/2000 | Lee |
| 6,110,437 A | 8/2000 | Schall et al. |
| 6,312,656 B1 | 11/2001 | Blackwell et al. |
| 6,364,944 B1 | 4/2002 | Mahmud et al. |
| 6,551,567 B2 | 4/2003 | Konya et al. |
| 6,565,823 B1 | 5/2003 | Hawtof et al. |
| 6,602,820 B1 | 8/2003 | Göbel et al. |
| 6,613,300 B2 | 9/2003 | Mangold et al. |
| 6,627,173 B2 | 9/2003 | Hemme et al. |
| 6,630,084 B1 | 10/2003 | Oda |
| 6,767,377 B2 | 7/2004 | Schumacher et al. |
| 6,887,566 B1 | 5/2005 | Hung et al. |
| 7,083,769 B2 | 8/2006 | Moerters et al. |
| 7,351,388 B2 | 4/2008 | Schumacher et al. |
| 2002/0041963 A1 | 4/2002 | Konya et al. |
| 2003/0029194 A1 | 2/2003 | Mangold et al. |
| 2004/0156773 A1 | 8/2004 | Kutsovsky |
| 2005/0238560 A1 | 10/2005 | Kutsovsky |
| 2006/0153764 A1 | 7/2006 | Schumacher et al. |
| 2006/0154994 A1 | 7/2006 | Schumacher et al. |
| 2006/0155042 A1 | 7/2006 | Schumacher et al. |
| 2006/0155052 A1 | 7/2006 | Schumacher et al. |
| 2007/0253884 A1 | 11/2007 | Liu et al. |
| 2009/0131517 A1 | 5/2009 | Height et al. |

FOREIGN PATENT DOCUMENTS

| | | |
|---|---|---|
| EP | 0 471 139 A2 | 2/1992 |
| JP | 59-223217 A | 12/1984 |
| WO | WO 90/10596 A1 | 9/1990 |
| WO | WO 90/15019 A1 | 12/1990 |
| WO | WO 98-09753 | 3/1998 |
| WO | WO 98/09753 A1 | 3/1998 |
| WO | WO 2004-048261 | 6/2004 |
| WO | WO 2004/056461 A2 | 7/2004 |
| WO | WO 2004/085311 A1 | 10/2004 |
| WO | WO 2006/084390 A1 | 8/2006 |

OTHER PUBLICATIONS

Barthel, et al. "Particle Sizes of Fumed Silica," Chem. Eng. Technol. 21 (1998) 9, pp. 745-752.*

HDK®, as accessed on [http://www.wacker.com/cms/media/publications/downloads/6174_EN.pdf] on Feb. 9, 2011.*

Briesen et al., Chemical Engineering Science, 53(24): 4105-4112 (Dec. 1998).

Briesen et al., World Congress on Particle Technology, 3: 1-6 (Jul. 6-9, 1998).

Brunauer et al., The Journal of the American Chemical Society, LX: 309-319 (Feb. 1938).

Davidson et al., Journal of the Chemical Society, Faraday Transaction 1, 71: 2260-2265 (1975).

Davidson et al., Journal of the Chemical Society, Faraday Transaction I, 72: 1088-1095 (1976).

Donnet et al. Carbon Black Science and Technology (Donnett et al.eds), 16-18 (Marcel Dekker, Inc., New York, NY 1993).

Glassman, Combustion (Glassman ed.), 15-27 (Academic Press, Orlando, FL. 1987).

Glumac, Combustion and Flame; The Journal of the Combustion Institute, 125: 702-711 (Mar. 2001).

Guth, The Physical Review, 53(2): 322 (1938).

Hasegawa et al., Journal of Materials Science Letters, 15(18): 1608-1611 (1996).

Hshieh, Fire and Materials, An International Journal, 23(2): 79-89 (Mar.-Apr. 1999).

Hung et al., Journal of Materials Research, 7(7): 1861-1869 (Jul. 1992).

Ingebo et al., National Advisory Committee for Aeronautics Technical Note 4087: 1-36 (Oct. 1957).

Kammler et al., Journal of Nanoparticle Research, 1: 467-477 (1999).

Kammler et al., Chem. Eng. Technol. 24(6): 583-596 (2001).

Kammler et al., AICHE Journal, 47(7): 1533-1543 (Jul. 2001).

Kodas et al., Aerosol Processing of Materials (Kodas et al., eds), 28-31, 280-291, 302-311 (Wiley-VCH, New York, NY, 1999).

Kroschwitz, Kirk-Othmer Encyclopedia of Chemical Technology, 4$^{th}$ ed. (Kroschwitz exec.ed.), 22: 1026-1027 (John Wiley & Sons, New York, NY, 1997).

Mädler et al., Journal of Aerosol Science, 33: 369-389 (2002).

Mädler, KONA, 22: 107-120 (2004).

Sano et al., Proceedings of the 7$^{th}$ International Conference on Liquid Atomization and Spray Systems, Aug. 18-22, 1997, Seoul, Korea, 97(2): 1045-1052.

Sanogo et al., The Journal of the Electrochemical Society, 144(8): 2919-2923 (Aug. 1997).

Seto et al., Aerosol Science and Technology, 27: 422-438 (Sep. 3, 1997).

Suzuki et al., Journal of Materials Science, 27(3): 679-684 (Feb. 1, 1992).

Vallet-Regi et al., Materials Science Forum, 235-238: 291-296.

Weiss et al., ARS Journal, 29(4): 252-259 (Apr. 1959).

European Patent Office, International Search Report in International Patent Application No. PCT/US2009/056064 (Jul. 5, 2010).

European Patent Office, International Preliminary Examination Report in International Patent Application No. PCT/US2009/056064 (Mar. 8, 2011).

* cited by examiner

FUMED SILICA OF CONTROLLED AGGREGATE SIZE AND PROCESSES FOR MANUFACTURING THE SAME

BACKGROUND OF THE INVENTION

There are many applications for fumed metal oxides, particularly for fumed silica. Such applications include fillers for polymers such as rubber, coatings such as for paper (i.e., recording media), cosmetics, the manufacture of optical fibers and quartz glassware, thermal insulation, and chemical-mechanical polishing compositions intended for use in semiconductor manufacturing.

Fumed silica is generally produced by the vapor phase hydrolysis of chlorosilanes, such as silicon tetrachloride, in a hydrogen oxygen flame. Such processes are generally referred to as pyrogenic processes. The overall reaction is:

$$SiCl_4 + 2H_2 + O_2 \rightarrow SiO_2 + 4HCl$$

Organosilanes also have been used in pyrogenic processes for the production of fumed silica. In the vapor phase hydrolysis of organosilanes, the carbon-bearing fragments undergo oxidation to form carbon dioxide as a by-product along with hydrochloric acid.

In this process, submicron-sized molten spheres of silica are formed. These particles collide and fuse to form three-dimensional, branched, chain-like aggregates, of approximately 0.1-0.5 μm in length. Cooling takes place very quickly, limiting the particle growth and ensuring that the fumed silica is amorphous. These aggregates in turn form agglomerates of 0.5-44 μm (about 325 US mesh). Fumed silica can have high purity, with total impurities in many cases below 100 ppm (parts per million). This high purity makes fumed silica dispersions particularly advantageous for many applications.

Numerous methods have been developed in the art to produce fumed silica via pyrogenic processes. U.S. Pat. No. 2,990,249 describes a process for the pyrogenic production of fumed silica. In accordance with this process, a gaseous feedstock comprising a fuel, such as methane or hydrogen, oxygen, and a volatile silicon compound, such as silicon tetrachloride, wherein the oxygen is present in a stoichiometric or hyperstoichiometric proportion, is fed into a burner supporting a short flame having a ratio of height to diameter of about 2:1 or below. Water formed by the combustion of the fuel in oxygen reacts with the silicon tetrachloride to produce silicon dioxide particles, which coalesce and aggregate to form fumed silica. The effluent from the burner is cooled, and the fumed silica is then collected.

U.S. Pat. No. 4,108,964 describes a process for the pyrogenic production of fumed silica using organosilanes as the silicon-containing component. In accordance with this process, an organosilane, such as methyltrichlorosilane, is volatilized at a temperature above the boiling point of the organosilane. The vaporized organosilane is mixed with a gaseous fuel, such as hydrogen or methane, and an oxygen-containing gas containing from 15-100% oxygen, to form a feedstock. The feedstock is fed to a flame supported by a burner at various flow rates to produce fumed silica. The volume ratios of the individual gas components are reported not to be of critical importance. The molar ratio of the organosilane to the water-forming gases generally is said to be in the range of from 1:0 to 1:12.

Conventional processes produce fumed silica with particular, relatively narrow, ranges of aggregate size and surface area. Conventional processes do not achieve a wider range of aggregate sizes because the flame temperature largely determines the size and the structure of the aggregates produced by such processes. Specifically, when silica particles are formed in the flame, the particles are initially in a semi-liquid form and grow into aggregates up to a certain extent, depending on the flame temperature. However, due to radiative cooling or forced cooling, the temperature of the aggregates rapidly drops to the point at which the particles can no longer grow into larger aggregates, thereby limiting the aggregates to a relatively narrow size range. A process capable of producing fumed silica with a wider range of possible aggregate sizes for a given surface area would be useful, especially to produce fumed silica having a relatively larger aggregate size, which can provide many benefits, including improved rheological properties (such as higher viscosity and greater dispersibility in liquid media).

Fumed silica aggregates also have an inherent structure, because they are fractal-like, or branched, particles. Because a fumed silica aggregate is branched, and is not a solid, convex shape, it encompasses a volume associated with its apparent aggregate size, as is well-known in the field of fumed particles. This encompassed volume can be described in a ratio known as the coefficient of structure, i.e., the ratio of the aggregate's encompassed volume to its actual volume of solid silica. In a conventional fumed silica process, the coefficient of structure is set by surface area, aggregate size, and fractal dimension.

There is a need for fumed silica having different combinations of physical features, such as aggregate size, surface area, and coefficient of structure. For example, a process that raises aggregate size and coefficient of structure at the same time would enhance the improvements in rheological and reinforcement properties that would follow an aggregate size increase. Moreover, a process capable of changing the coefficient of structure independently of aggregate size could be useful in producing fumed silica with increased dispersibility, and could offer performance tradeoffs different from currently commercially available materials.

BRIEF SUMMARY OF THE INVENTION

The invention provides fumed silica having an aggregate size D (as measured by photocorrelation spectroscopy (PCS), in units of nm) and a surface area SA (as measured by the method of S. Brunauer, P. H. Emmet, and I. Teller, *J. Am. Chemical Society*, 60: 309 (1938) (BET), in units of m²/g) satisfying the formula $D \geq 151 + (5400/SA) + 0.00054(SA-349)^2$.

The invention also provides fumed silica having a surface area of from 100 to 300 m²/g, wherein a 3 wt. % dispersion of the fumed silica in mineral oil satisfies any one or more of the following conditions: (a) a viscosity at a shear rate of 10 s⁻¹ of 0.25 Pa·s or more, (b) a power-law exponent index, over a shear rate range of 0.1-5000 s⁻¹, that is 0.8 or less, and (c) an elastic modulus in a frequency range of 0.1-100 rad/s of 16-100 Pa.

The invention further provides fumed silica comprising aggregates of primary particles, wherein the primary particles have at least a bi-modal particle size distribution representing populations of primary particles having at least two different average primary particle sizes, and wherein the smallest average primary particle size is 0.05 to 0.4 times the largest average primary particle size.

The invention additionally provides a process for producing fumed silica, especially fumed silica of the invention. In the inventive process, a stream of a feedstock comprising a silica precursor and a stream of a combustible gas are provided. A stream of combusted gas with fumed silica particles suspended therein, wherein the fumed silica particles comprise aggregates of primary particles, is formed in a reactor by (1) mixing the stream of the feedstock with the stream of the combustible gas to form a stream of combustible gas with the silica precursor, and then combusting the stream of combustible gas with the silica precursor to form the stream of combusted gas with fumed silica particles suspended therein, and/or (2) combusting the stream of combustible gas to form a stream of combusted gas and then mixing the stream of the feedstock with the stream of the combusted gas to form a stream of combusted gas with the silica precursor suspended therein, which then forms fumed silica particles having a first aggregate size. Fumed silica particles having a second aggregate size, the second aggregate size being greater than the first aggregate size, are formed by allowing contact among the fumed silica particles having the first aggregate size in the stream of combusted gas and either (1) contacting the fumed silica particles having the first aggregate size with one or more dopants to modify surfaces thereof, (2) controlling the temperature-time profile, or history, of the fumed silica particles having the first aggregate size to allow post-quench aggregate growth, (3) introducing additional feedstock into the stream of combusted gas with the fumed silica particles having the first aggregate size suspended therein, or (4) carrying out a combination of any of the foregoing items (1), (2), and (3). The fumed silica particles having the second aggregate size then are recovered from the stream of combusted gas.

The inventive process provides large-aggregate fumed silica and desirably controls the coefficient of structure $C_S$ of the fumed silica. The larger-aggregate fumed silica with a larger coefficient of structure shows improved characteristics such as increased viscosity, improved dispersibility, and improved elastic modulus when dispersed in mineral oil, when compared with commercial silica of similar surface area. Fumed silica of large aggregates with lower coefficients of structure also can show improved dispersibility as well as other performance benefits especially when the particles are surface-treated with a suitable agent.

BRIEF DESCRIPTION OF THE DRAWING(S)

FIG. 1 is a graph of mass-average aggregate size (nm) versus surface area (m²/g) for exemplary conventional fumed silicas along with a curve fit to the typical values and an upper bound. Solid circle, triangle, and diamond symbols represent conventional fumed silica. Solid triangles and solid diamonds indicate fumed silicas, available from Evonik Degussa, and from Wacker, respectively. Error bars represent 95% confidence intervals for process and test variability. Line (a) represents an upper limit to the aggregate size for conventional fumed silica, represented by the formula $D \geq 151+(5400/SA)+0.00054(SA-349)_2$. Line (b) represents a curve fit to the solid circles in the graph and can be represented by the formula $D=126+(7046/SA)+0.000235(SA-285)^2$.

FIG. 2 is a graph of mass-average aggregate size (nm) versus surface area (m²/g) for exemplary fumed inventive fumed silicas as compared with exemplary conventional fumed silica. Solid circle, diamond, and triangle symbols represent the conventional fumed silicas depicted in FIG. 1. Open diamond, square, and triangle symbols represent fumed silicas made by the inventive process, particularly the embodiments involving the use of one or more dopants (open diamonds), post-quench aggregate growth (open squares), and the downstream introduction of feedstock (open triangles) as described herein. Error bars represent 95% confidence intervals for process and test variability. Lines (c) and (d) represent preferred and more preferred, respectively, minimum average aggregate sizes at given surface areas for the inventive fumed silica. Line (e) represents estimated maximum average aggregate sizes at given surface areas for the inventive fumed silica.

FIG. 3 is a graph of coefficient of structure ($C_S$) versus mass-average aggregate size (nm) for exemplary inventive fumed silicas (open square and triangle symbols) as compared with exemplary conventional fumed silicas (solid circle and diamond symbols). The symbols represent the same types of fumed silicas depicted in FIG. 2. Error bars represent 95% confidence intervals for test variability. The dotted horizontal line at $C_S=58$ represents the estimated upper limit of the coefficient of structure achievable for conventional fumed silicas for the indicated aggregate size range.

FIG. 4 is a graph of coefficient of structure ($C_S$) versus surface area (m²/g) for exemplary inventive fumed silicas (open square and triangle symbols) as compared with exemplary conventional fumed silicas (solid circle and diamond symbols). The symbols represent the same types of fumed silicas depicted in FIG. 2. Error bars represent 95% confidence intervals for test variability. The dotted horizontal line at $C_S=58$ represents the estimated upper limit of the coefficient of structure achievable for conventional fumed silicas for the indicated surface area range.

FIG. 5 is a graph of viscosity in mineral oil at a shear of 10 $s^{-1}$ (Pa·s) versus surface area (m²/g) for exemplary inventive fumed silicas (open square and triangle symbols) as compared with exemplary conventional fumed silicas (solid circle symbols). The symbols represent the same types of fumed silicas depicted in FIG. 2. Error bars represent 95% confidence intervals for test variability. The dotted horizontal line illustrates the viscosity limit of dispersions of conventional fumed silicas in indicated surface area range, i.e., 0.25 Pa·s.

FIG. 6 is a graph of elastic modulus in mineral oil (Pa) versus surface area (m²/g) for exemplary inventive fumed silicas (open square symbols) as compared with exemplary conventional fumed silicas (solid circle symbols). The symbols represent the same types of fumed silicas depicted in FIG. 2. The dotted horizontal line represents the estimated limit of conventional fumed silica's ability to build elastic modulus in mineral oil, i.e., up to 16 Pa.

FIG. 7 is a graph of mass-average aggregate size (mm) versus surface area (m²/g) for different exemplary inventive fumed silicas with respect to the adiabatic temperature increase in an embodiment of the inventive process involving temperature-time profile control. The graphed points illustrate the aggregate size and surface area for exemplary conventional fumed silicas (solid circle symbols) and for fumed silicas produced in accordance with the inventive process employing post-quench aggregate growth (open square symbols). The dashed-line curves are fit to the process data and represent predicted final aggregate sizes and surface areas, given the amount of heat applied as degrees of adiabatic temperature increase (indicated by horizontal tick marks and numbers on the lines).

DETAILED DESCRIPTION OF THE INVENTION

Figure 1:
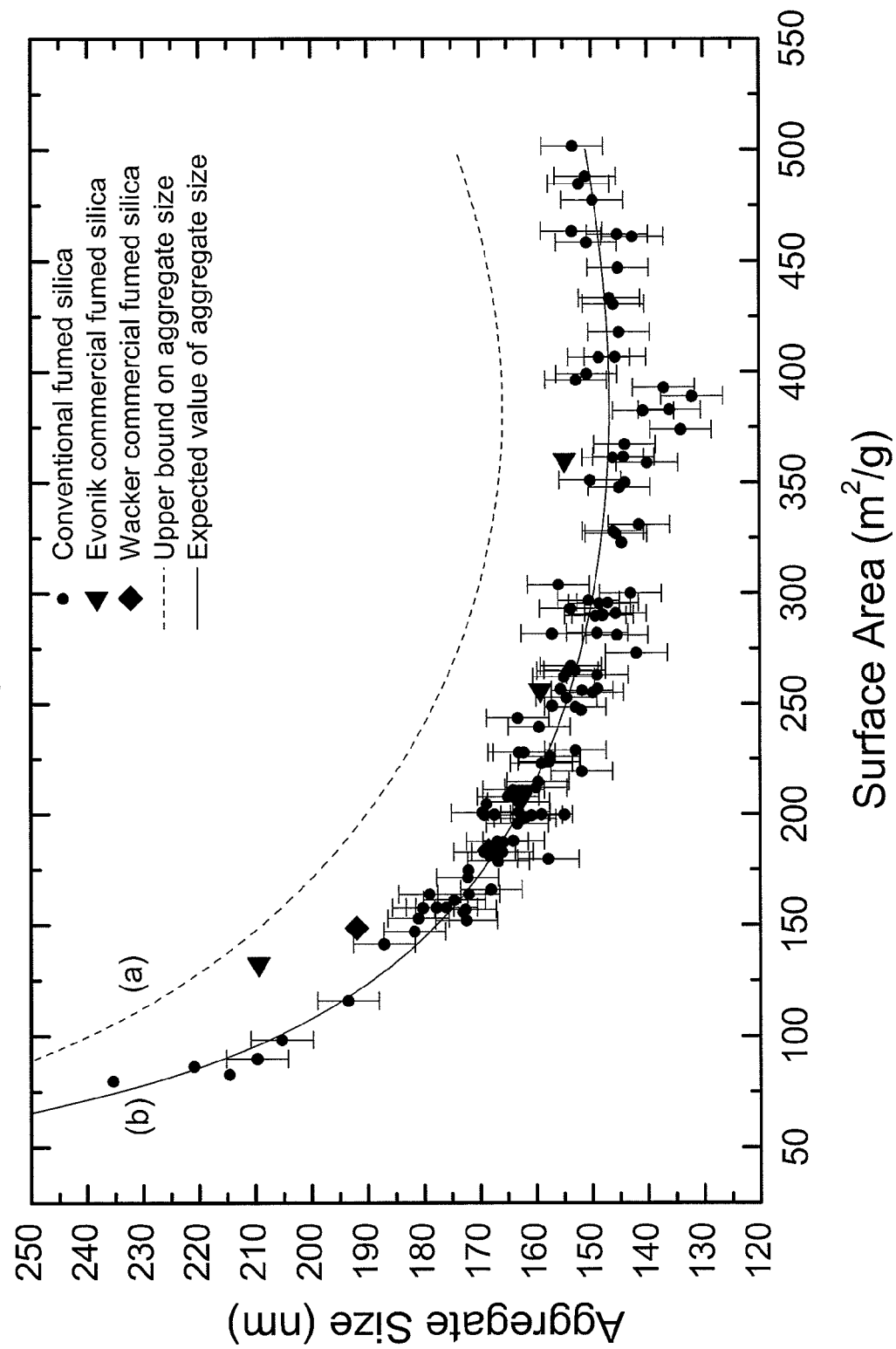

The invention provides fumed silica comprising aggregates of primary particles, wherein the aggregates have an aggregate size D and a surface area SA satisfying the formula $D \geq 151+(5400/SA)+0.00054(SA-349)^2$. A conventional commercial process for producing fumed silica cannot produce fumed silica satisfying the aforementioned formula. Moreover, a conventional commercial process for producing fumed silica cannot produce fumed silica with a desired coefficient of structure $C_S$ as well as a desired aggregate size D and a desired surface area SA because the commercial process does not allow for controlling the $C_S$ value independently of aggregate size, surface area, or fractal dimension.

Thus, the inventive fumed silica can be characterized by any one or more of an aggregate size D, a surface area SA, and a coefficient structure Cs, each of which values represents a mass-weighted average value for the fumed silica.

The fumed silica can have an aggregate size D of 120 nm or more, e.g., 140 nm or more, 150 nm or more, 160 nm or more, or 180 nm or more. Alternatively, or in addition, the fumed silica can have an aggregate size D of 300 nm or less, e.g., 280 nm or less, 280 nm or less, 260 nm or less, 250 nm or less, or 240 nm or less. Thus, the fumed silica can have an aggregate size D bounded by any two of the above endpoints. For example, the fumed silica can have an aggregate size D of 120-300 nm, 140-300 nm, 140-260 nm, or 150-240 nm.

The fumed silica can have a surface area SA of 50 m²/g or more, e.g., 100 m²/g or more, 150 m²/g or more, or 200 m²/g or more. Alternatively, or in addition, the fumed silica can have a surface area SA of 550 m²/g or less, e.g., 500 m²/g or less, 450 m²/g or less, 400 m²/g or less, 350 m²/g or less, or 300 m²/g or less. Thus, the fumed silica can have an surface area SA bounded by any two of the above endpoints. For example, the fumed silica can have a surface area SA of 50-550 m²/g, 100-500 m²/g, 100-450 m²/g, 150-400 m²/g, or 200-300 m²/g.

The fumed silica can have a coefficient of structure Cs of 58 or more, e.g., 60 or more, 62 or more, 64 or more, 65 or more, 66 or more, 68 or more, or 70 or more. Alternatively, or in addition, the fumed silica can have a coefficient of structure Cs of 90 or less, e.g., 85 or less, 80 or less, or 75 or less. Thus, the fumed silica can have a coefficient of structure Cs bounded by any two of the above endpoints. For example, the fumed silica can have a coefficient of structure Cs of 58-90, 58-80, 60-85, 60-80, or 67-70.

Moreover, the fumed silica can have a combination of the foregoing aggregate size D, surface area SA, and coefficient of structure Cs values. For example, the fumed silica can have (a) an aggregate size $D \geq 120$ nm and a coefficient of structure Cs>58, (b) an aggregate size D satisfying the formula $120 \leq D \leq 300$ and a surface area SA satisfying the formula 50<SA<550, and a coefficient of structure Cs satisfying the formula $58 \leq C_S \leq 90$, or (c) an aggregate size D satisfying the formula $120 \leq D \leq 300$, a surface area SA satisfying the formula $100 \leq SA \leq 400$, and a coefficient of structure Cs satisfying the formula $58 \leq C_S \leq 90$.

FIG. 1 is a graph showing typical sizes of conventional fumed silicas. The horizontal axis represents the BET surface area SA (m²/g), and the vertical axis represents the PCS aggregate size D (nm). Circle, diamond, and left-triangle solid symbols represent conventional and/or commercial fumed silicas. The line (a) represents an upper bound to aggregate sizes for conventional commercial silicas, represented by the aforementioned formula. The line (b) represents a curve fit to the solid circles in the graph. The inventive methods allow the production of fumed silica having an aggregate size D larger than the upper limit of the conventional fumed silica aggregate size as indicated by the line (a) and thus satisfying the formula $D \geq 151+(5400/SA)+0.00054(SA-349)^2$.

As is well known in the art, fumed silica, which also is known as pyrogenic silica, comprises, at the smallest scale, primary particles. Primary particles are formed by covalent bonds between atoms making up the particles and are stable to all but the harshest conditions. At the next scale, primary particles are associated into secondary particles, generally referred to as aggregates. Aggregate particles are formed from primary particles that are bonded together by covalent bonds. Fumed silica typically exists in the form of aggregates having a branched chain-like structure of primary particles. Both primary particles and aggregated primary particles (i.e., aggregates or secondary particles) can be characterized as having an average particle size, which refers to the diameter of the smallest sphere that encloses the particle, i.e., either the primary particle or the aggregate. As utilized herein, the term "particle" refers to the aggregate unless otherwise noted. At the next larger scale, aggregates are more loosely associated into agglomerates. Typically, agglomerates can be disassociated into the constituent aggregates via mechanical energy inputs.

The aggregate size is the diameter of the smallest sphere that encompasses the aggregate. The aggregate size D (nm) is the mass-average aggregate size of the fumed silica determined by photocorrelation spectroscopy (PCS). The PCS measurement provides a mass-weighted average aggregate size, as compared to a transmission electron micrograph (TEM) analysis, which provides a number-weighted average aggregate size.

In particular, the aggregate size D (nm) is determined using a PCS particle size analyzer, specifically a Brookhaven 90Plus/BI-MAS (Multi Angle Particle Sizing Option) PCS particle size analyzer, which uses the frequency-intensity spectrum of scattered light due to the Brownian motion of the particles as a function of time to determine the effective diameter of suspended particles. The technique employed is based on correlating the fluctuations about the average scattered laser light intensity and is capable of determining mean sizes ranging from 2 nanometers to 3 microns. All tests are run using a 90° angle over a collection time of 2 min according to the manufacturer's recommendations. The temperature is set and controlled at 25° C. A 200 nm polymer latex sphere standard from Duke Scientific is used as the calibration standard.

The fumed silica samples for PCS measurement are prepared and evaluated to determine aggregate size using the PCS particle size analyzer as follows:

(1) Prepare a 1.2 wt. % dispersion of fumed silica in pH 10.5 water (use deionized water and adjust the pH with 0.5 N NaOH) by sonicating continuously for 7 min at 50 W. The sonicator can be the Misonix Model XL2020 sonicator with power converter and Mosonix tapped titanium horn probe, or a similar sonicator.

(2) Once the dispersion has been sonicated, measure the pH and re-adjust the pH to 10.5 by using 0.5 N NaOH solution.

(3) In a disposable cuvette, add 24 mL of filtered pH 10.5 water. Use a 0.20 micron syringe filter attached to a disposable syringe for this procedure.

(4) Add 0.075 mL of the dispersion adjusted in step 2 to the cuvette containing pH 10.5 filtered water prepared in step 3.

(5) Place the cuvette in the Brookhaven PCS instrument, allow it to equilibrate for 6 min, and record the measured diameter.

The surface area SA (m²/g) is the average surface area of the aggregates determined by the method of S. Brunauer, P. H. Emmet, and I. Teller, *J. Am. Chemical Society*, 60: 309 (1938), which is commonly referred to as the BET method.

The coefficient of structure $C_S$ can be calculated by measuring the relative viscosity of fumed silica dispersions of various volume fractions (e.g., ranging from 0 to 0.02) in a suitable fluid (e.g., mineral oil) and fitting the experimental data to the Guth-Gold equation (Guth et al., *Phys. Rev.*, 53: 322 (1938)). "Mineral oil" refers to a mixture of alkanes (typically of 15 to 40 carbons), which is a by-product in the distillation of petroleum to produce gasoline. Mineral oil is particularly suitable as the liquid medium for measuring viscosity, power-law exponent index, and elastic modulus of the fumed silica because mineral oil does not interact with the fumed silica in a preferential manner. A detailed explanation of the calculation of coefficient of structure is as follows:

(a) A dispersion of fumed silica (batch size=30 g) is prepared by (i) mixing an appropriate mass of silica (ranging from 0 to 5 wt. %) in the mineral oil, (ii) mixing for 10 min in a dual asymmetric centrifuge-type mixer (e.g., DAC 150 FVZ manufactured by Flacktek Inc.), and (iii) shearing in a rheometer (AR2000EX manufactured by TA Instruments) for 2 h at 5000 s⁻¹ using a cone and plate geometry (1 degree, 40 mm). The temperature during the rheology experiments is controlled and maintained at 25° C.

(b) The volume fraction φ is calculated by the formula:

$$\phi = \frac{\text{mass of silica/density of silica}(=2.2\ \text{g/cm}^3)}{\left(\frac{\text{mass of silica}}{\text{density of silica}(=2.2\ \text{g/cm}^3)}\right) + \left(\frac{\text{mass of mineral oil}}{\text{density of mineral oil}(=0.815\ \text{g/cm}^3)}\right)}$$

(c) The viscosity of the dispersion ($\eta_{dispersion}$) is the value, measured at a shear rate of 10 s⁻¹ obtained after following the procedure described in (a).

The structure factor Cs, the volume fraction φ, the viscosity of the dispersion of fumed silica ($\eta_{dispersion}$), and the viscosity of the mineral oil ($\eta_{mineral\ oil}$) satisfy the formula:

$$(\eta_{dispersion}/\eta_{mineral\ oil}) = 1 + 2.5 C_s \phi + 14.1 C_s^2 \phi^2.$$

This equation is known in the art and is described by E. Guth and O. Gold in *Phys. Rev.*, 53: 322 (1938). Larger values of Cs are indicative of more effective volume per unit mass and, therefore, a more open structure, at a given surface area. The coefficient of structure Cs for fumed silica reflects the ratio of the "apparent volume" over the actual, physical volume that the fumed silica occupies in the fluid. Because a fumed silica particle has a branched, open structure, the fumed silica particle encompasses or interacts with much more fluid volume (per unit mass of solid) than it would if it were of a simple convex shape, such as a sphere. In a high-shear rheological test, this "apparent volume" is measured by the degree to which the fumed silica particles increase the viscosity of a fluid. This volume is typically 4-7 times the actual, physical volume of individual fumed silica particles.

Figure 2:
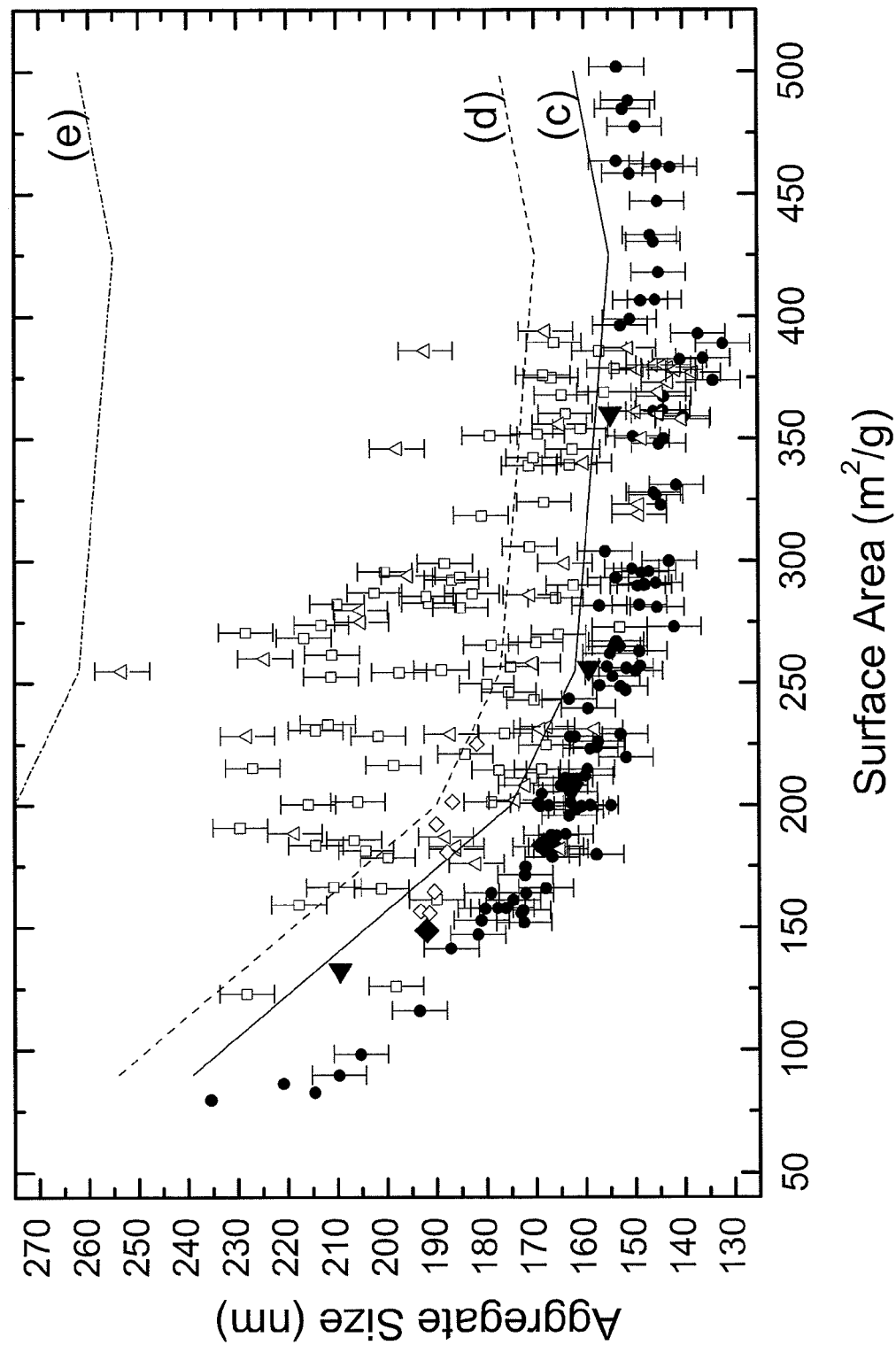

FIG. 2 is a graph showing the aggregate sizes of inventive fumed silicas as compared with conventional fumed silicas. Solid circle, diamond, and triangle symbols represent the conventional and/or commercial fumed silicas depicted in FIG. 1. Open diamond symbols represent inventive fumed silicas made by the dopant addition process as described herein. Open square symbols represent inventive fumed silicas made by the inventive process employing post-quench aggregate growth as described herein. Open triangle symbols represent inventive fumed silicas made by the downstream introduction of additional feedstock as described herein. Error bars in FIGS. 1 and 2, when present, represent 95% confidence intervals for process and test variability.

The inventive fumed silica preferably has an aggregate size D larger than the aggregate size indicated by the line (c) of FIG. 2 at a given surface area. In other words, the inventive fumed silica preferably satisfies the following set of formulas (1):

$D \geq 291 - 0.58(SA)$, where $50 \leq SA \leq 200$;

$D \geq 222 - 0.24(SA)$, where $200 < SA \leq 255$;

$D \geq 173 - 0.04(SA)$, where $255 < SA \leq 425$; and $D \geq 115 + 0.09(SA)$, where $425 < SA \leq 550$.

More preferably, the inventive fumed silica has an aggregate size D larger than the aggregate size indicated by the line (d) of FIG. 2 at a given surface area. In other words, the inventive fumed silica preferably satisfies the following set of formulas (2):

$D \geq 306 - 0.58(SA)$, where $50 \leq SA \leq 200$;

$D \geq 237 - 0.24(SA)$, where $200 < SA \leq 255$;

$D \geq 188 - 0.04(SA)$, where $255 < SA \leq 425$; and $D \geq 130 + 0.09(SA)$, where $425 < SA \leq 550$.

Also, the inventive fumed silica can have an aggregate size D smaller than an upper limit at a given surface area, as represented by the following set of formulas (3):

$874 - 1.75(SA) \geq D$, where $50 \leq SA \leq 200$;

$667 - 0.71(SA) \geq D$, where $200 < SA \leq 255$;

$518 - 0.12(SA) \geq D$, where $255 < SA \leq 425$; and $346 + 0.28(SA) \geq D$, where $425 < SA \leq 550$.

For example, the inventive fumed silica can have an aggregate size D smaller than the aggregate size indicated by the line (e) of FIG. 2 at a given surface area. In other words, the inventive fumed silica may satisfy the following set of formulas (4):

$391 - 0.58(SA) \geq D$, where $50 \leq SA \leq 200$;

$322 - 0.24(SA) \geq D$, where $200 < SA \leq 255$;

$273 - 0.04(SA) \geq D$, where $255 < SA \leq 425$; and $215 + 0.09(SA) \geq D$, where $425 < SA \leq 550$.

Alternatively or in addition, the inventive fumed silica may satisfy a combination of the sets of (a) formulas (1) or (2) and (b) formulas (3) or (4).

For example, the inventive fumed silica may satisfy the sets of formulas (1) and (3) as follows:

$874-1.75(SA) \geq D \geq 291-0.58(SA)$, where $50 \leq SA \leq 200$;

$667-0.71(SA) \geq D \geq 222-0.24(SA)$, where $200 < SA \leq 255$;

$518-0.12(SA) \geq D \geq 173-0.04(SA)$, where $255 < SA \leq 425$; and $346+0.28(SA) \geq D \geq 115+0.09(SA)$, where $425 \leq SA \leq 550$.

The inventive fumed silica may satisfy the sets of formulas (2) and (3) as follows:

$874-1.75(SA) \geq D \geq 306-0.58(SA)$, where $50 \leq SA \leq 200$;

$667-0.71(SA) \geq D \geq 237-0.24(SA)$, where $200 < SA \leq 255$;

$518-0.12(SA) \geq D \geq 188-0.04(SA)$, where $255 < SA \leq 425$; and $346+0.28(SA) \geq D \geq 130+0.09(SA)$, where $425 \leq SA \leq 550$.

The inventive fumed silica may satisfy the sets of formulas (1) and (4) as follows:

$874-1.75(SA) \geq D \geq 291-0.58(SA)$, where $50 \leq SA \leq 200$;

$667-0.71(SA) \geq D \geq 222-0.24(SA)$, where $200 < SA \leq 255$;

$518-0.12(SA) \geq D \geq 173-0.04(SA)$, where $255 < SA \leq 425$; and $346+0.28(SA) \geq D \geq 115+0.09(SA)$, where $425 \leq SA \leq 550$.

The inventive fumed silica may satisfy the sets of formulas (2) and (4) as follows:

$874-1.75(SA) \geq D \geq 306-0.58(SA)$, where $50 \leq SA \leq 200$;

$667-0.71(SA) \geq D \geq 237-0.24(SA)$, where $200 < SA \leq 255$;

$518-0.12(SA) \geq D \geq 188-0.04(SA)$, where $255 < SA \leq 425$; and $346+0.28(SA) \geq D \geq 130+0.09(SA)$, where $425 \leq SA \leq 550$.

As is apparent from the graph of FIG. 2, the inventive fumed silica (open symbols) has a significantly larger aggregate size than conventional fumed silica of the same surface area.

Figure 3:
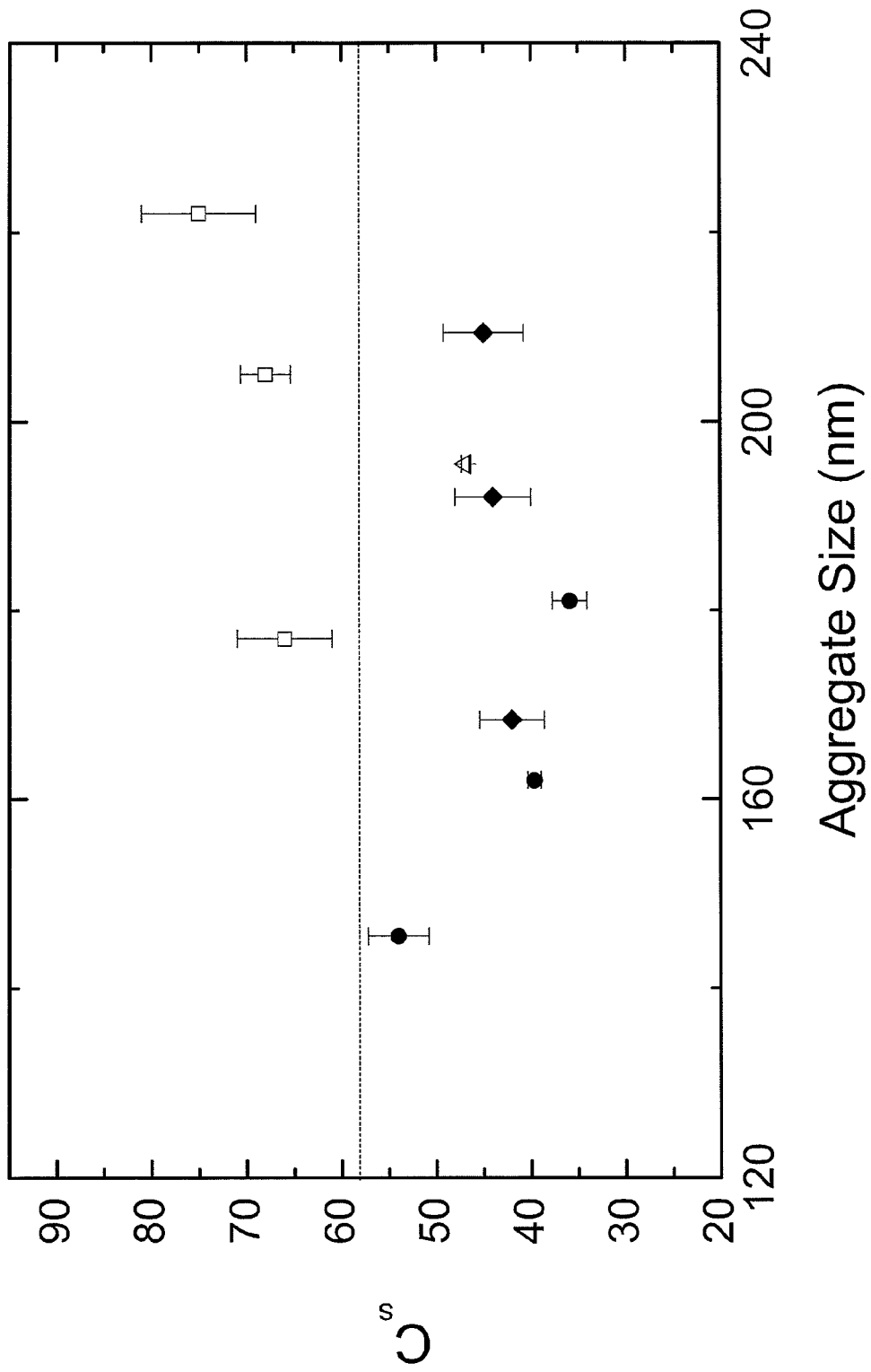
Figure 4:
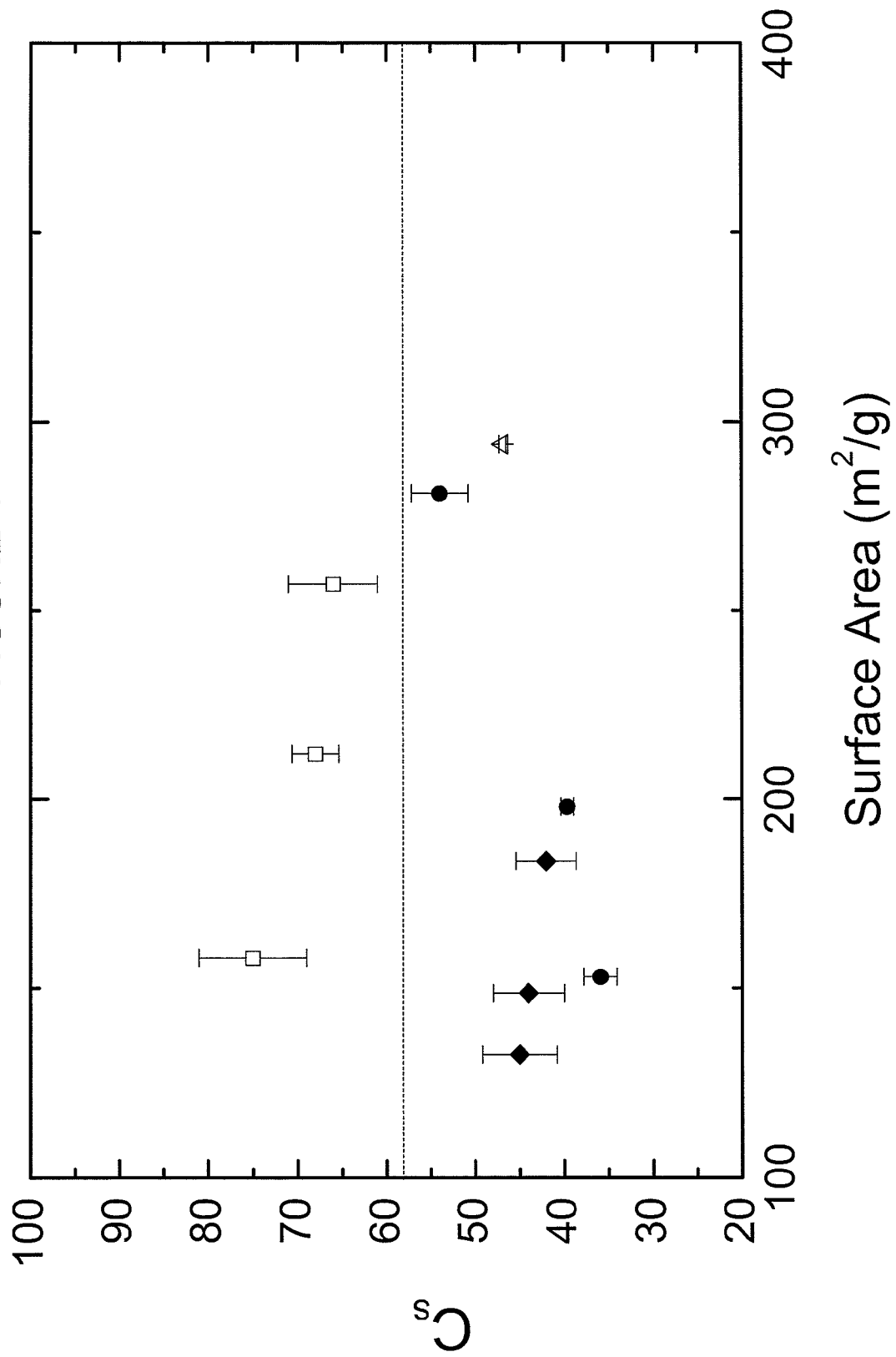

FIG. 3 and FIG. 4 show the coefficient of structure Cs of inventive fumed silicas and commercially available fumed silicas within a set range of aggregate size and surface area, respectively. As in FIG. 2, the solid circles and solid diamonds of FIG. 3 and FIG. 4 represent fumed silicas other than the inventive fumed silicas, while the open squares and triangle represent inventive fumed silicas. The dotted horizontal line at $C_S=58$ represents the estimated upper limit of the coefficient of structure achievable for conventional fumed silica for the aggregate size range and the surface area range depicted in FIG. 3 and FIG. 4, respectively. The invention can provide fumed silica with a higher coefficient of structure $C_S$ for a given aggregate size or surface area as compared to conventional fumed silica. The invention also can provide fumed silica having a significantly larger aggregate size than a commercial fumed silica at the same surface area, but with a $C_S$ value that is approximately equal to the $C_S$ value of the commercial fumed silica at the same surface area.

The particular coefficient of structure $C_S$ for a given aggregate size or surface area of fumed silica can be controlled by way of the inventive process described herein, particularly by choosing an appropriate embodiment of the inventive process, such as the embodiment involving the use of one or more dopants, the embodiment involving post-quench aggregate growth, or the embodiment involving the downstream introduction of feedstock (all of which are described herein).

Fumed silica having an increased aggregate size at a given surface area with respect to conventional fumed silica provides many performance benefits for both rheological applications (e.g., sag resistance, thickening, shear thinning, etc.) and reinforcement applications (e.g., silicone elastomer reinforcement, hardness, tensile strength, modulus, etc.). For example, fumed silica of increased aggregate size can provide greater fluid thickening per unit mass and achieve sharper, improved shear thinning. Also, fumed silica of increased aggregate size disperses faster than fumed silica of smaller aggregate size with the same surface area, thus making high-surface-area silica suitable for a greater number of applications. Moreover, large-aggregate fumed silica may provide better elastomer reinforcement than conventional fumed silica. Finally, fumed silica of larger aggregate size, in some fluids, may better resist physical aging and hysteresis.

The fumed silica of the invention can be additionally or alternatively characterized with reference to the characteristics of a dispersion of the fumed silica. In this respect, the invention also provides fumed silica comprising aggregates of primary particles, wherein the fumed silica has a surface area of 100-300 m$^2$/g, and wherein a 3 wt. % dispersion of the fumed silica in mineral oil exhibits at least one of (a) a viscosity at a shear rate of 10 s$^{-1}$ of 0.25 Pa·s or more, (b) a power-law exponent index over a shear rate range of 0.1 s$^{-1}$ to 5000 s$^{-1}$ that is 0.8 or less, and (c) an elastic modulus in a frequency range of from 0.1 rad/s to 100 rad/s that is 16-100 Pa. The 3 wt. % dispersion for determining viscosity, power-law exponent index, and elastic modulus is prepared as described in the following paragraphs.

A 3 wt. % dispersion of the fumed silica in mineral oil can exhibit a viscosity at a shear rate of 10 s$^{-1}$ of 0.25 Pa·s or more, e.g., 0.26 Pa·s or more, 0.27 Pa·s or more, 0.28 Pa·s or more, 0.29 Pa·s or more, 0.30 Pa·s or more, 0.31 Pa·s or more, or 0.32 Pa·s or more. Alternatively, or in addition, a 3 wt. % dispersion of the fumed silica in mineral oil can exhibit a viscosity at a shear rate of 10 s$^{-1}$ of 0.50 Pa·s or less, e.g., 0.45 Pa·s or less, 0.40 Pa·s or less, 0.38 Pa·s or less, 0.36 Pa·s or less, or 0.35 Pa·s or less. Thus, a 3 wt. % dispersion of the fumed silica in mineral oil can exhibit a viscosity at a shear rate of 10 s$^{-1}$ in a range defined by any two of the above endpoints. For example, a 3 wt. % dispersion of the fumed silica in mineral oil can exhibit a viscosity at a shear rate of 10 s$^{-1}$ of 0.25-0.50 Pa·s, 0.26-0.45 Pa·s, 0.26-0.40 Pa·s, 0.27-0.40 Pa·s, or 0.28-0.38 Pa·s.

A 3 wt. % dispersion of the fumed silica in mineral oil can exhibit a power-law exponent index over a shear rate range of 0.1 s$^{-1}$ to 5000 s$^{-1}$ that is 0.8 or less, e.g., 0.7 or less, 0.6 or less, 0.5 or less, or 0.4 or less. Alternatively, or in addition, a 3 wt. % dispersion of the fumed silica in mineral oil can exhibit a power-law exponent index over a shear rate range of 0.1 s$^{-1}$ to 5000 s$^{-1}$ that is 0.1 or more, e.g., 0.15 or more, 0.2 or more, 0.25 or more, or 0.3 or more. Thus, a 3 wt. % dispersion of the fumed silica in mineral oil can exhibit a power-law exponent index over a shear rate range of 0.1 s$^{-1}$ to 5000 s$^{-1}$ that is in a range defined by any two of the above endpoints. For example, a 3 wt. % dispersion of the fumed silica in mineral oil can exhibit a power-law exponent index over a shear rate range of 0.1 s$^{-1}$ to 5000 s$^{-1}$ that is 0.1-0.8, 0.1-0.7, 0.2-0.6, or 0.1-0.5.

A 3 wt. % dispersion of the fumed silica in mineral oil can exhibit an elastic modulus in a frequency range of from 0.1 rad/s to 100 rad/s that is 16 Pa or more and typically 100 Pa or less. A 3 wt. % dispersion of the fumed silica in mineral oil can exhibit an elastic modulus in a frequency range of from 0.1 rad/s to 100 rad/s that is 18 Pa or more, 20 Pa or more, 22 Pa or more, 24 Pa or more, 25 Pa or more, 26 Pa or more, 28 Pa or more, 30 Pa or more, 32 Pa or more, 34 Pa or more, or 35 Pa or more. Alternatively, or in addition, a 3 wt. % dispersion of the fumed silica in mineral oil can exhibit an elastic modulus in a frequency range of from 0.1 rad/s to 100 rad/s that is 90 Pa or less, 85 Pa or less, 80 Pa or less, 75 Pa or less, 70 Pa or less, 65 Pa or less, or 60 Pa or less. Thus, a 3 wt. % dispersion of the fumed silica in mineral oil can exhibit an elastic modulus that is in a range defined by any two of the above endpoints. For example, a 3 wt. % dispersion of the fumed silica in mineral oil can exhibit an elastic modulus in a frequency range of from 0.1 rad/s to 100 rad/s that is 20-100 Pa, 20-90 Pa, 20-80 Pa, 25-100 Pa, 25-80 Pa, or 30-100 Pa.

Figure 5:
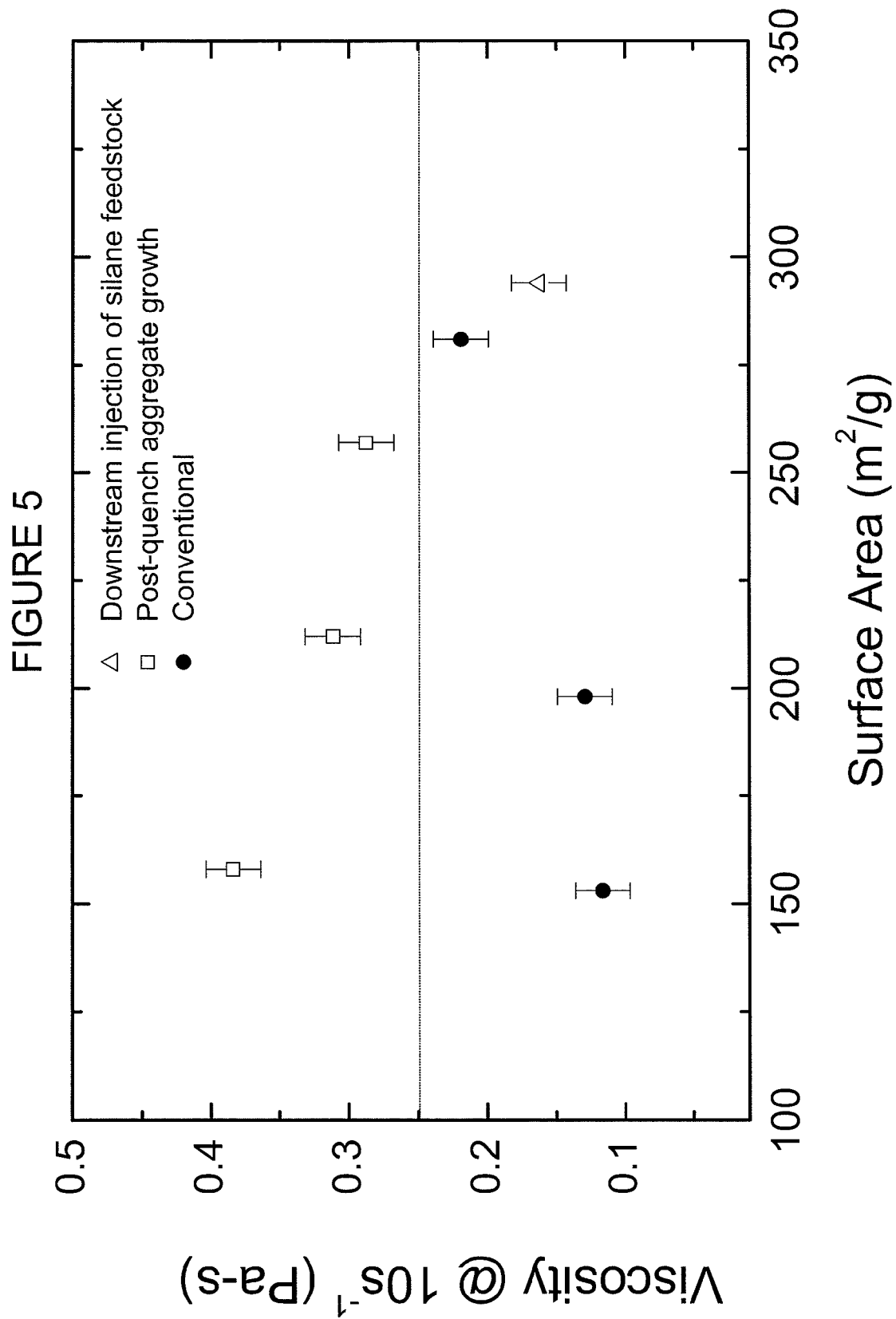

FIG. 5 illustrates the comparison in viscosity between dispersions of the inventive fumed silica and conventional fumed silica. Open squares represent the inventive fumed silicas produced by the inventive method employing the temperature-time profile control, while the open triangle represents the inventive fumed silicas produced by the inventive process employing the downstream introduction of the feedstock. The solid circles represent conventional fumed silicas. All points in FIG. 5 represent 3 wt. % dispersions of the silica in mineral oil, with viscosity measured at a shear rate of 10 s$^{-1}$ in a cone-and-plate rheometer. The dotted horizontal line in FIG. 5 illustrates the viscosity limit of dispersions of conventional fumed silicas in the indicated surface area range, i.e., 0.25 Pa·s. Compared to the conventional fumed silicas (represented by solid circles), the inventive fumed silicas produced by the inventive process employing post-quench aggregate growth (represented by open squares) exhibit larger aggregate sizes and higher viscosities in dispersion, thereby achieving greater thickening in a fluid. In contrast, dispersions of the inventive fumed silica produced by the inventive process involving the downstream introduction of the feedstock (represented by the open triangle) have a viscosity in the fluid in line with the expected value for conventional fumed silicas in the illustrated surface area range. Thus, the inventive process involving the downstream introduction of the feedstock is highly useful in producing fumed silica with a larger aggregate size without significantly increasing the viscosity of the resulting dispersions.

Figure 6:
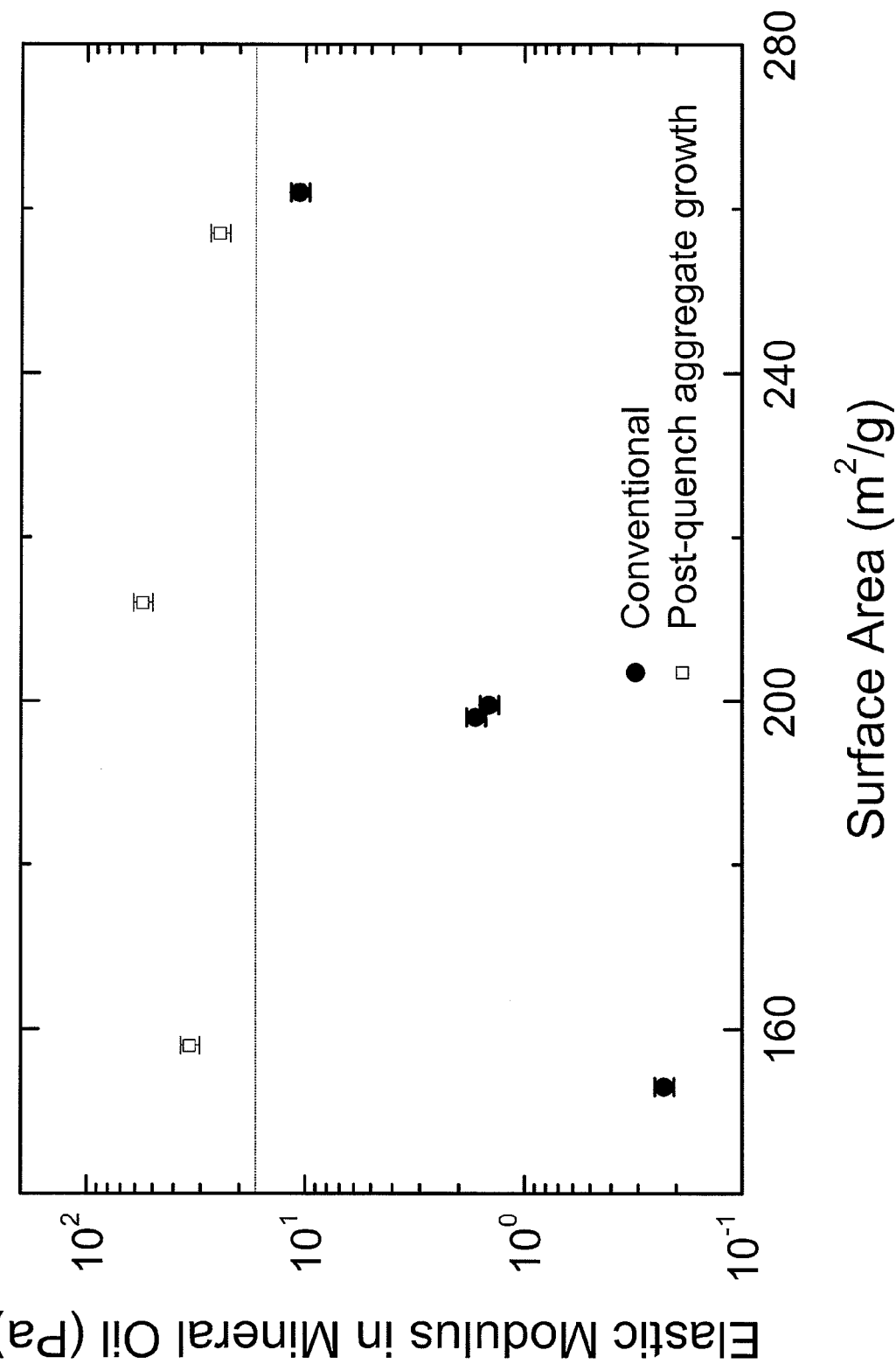

FIG. 6 shows how the inventive fumed silicas with larger aggregate sizes can provide greater elastic modulus in a fluid (in this case, mineral oil) than conventional fumed silicas of the same surface area. The dotted horizontal line represents the estimated limit of conventional fumed silica's ability to build elastic modulus in mineral oil, i.e., up to 16 Pa. As in FIG. 5, open squares represent the inventive fumed silicas produced by the inventive method employing post-quench aggregate growth, and solid circles represent conventional fumed silicas.

The viscosity of the 3 wt. % dispersion of the fumed silica is measured as follows. A dispersion of fumed silica (batch size=30 g) is prepared by (i) mixing the appropriate mass of silica in the mineral oil, (ii) mixing for 10 min in a dual asymmetric centrifuge-type mixer (e.g., DAC 150 FVZ, Flacktek), and (iii) shearing in a rheometer (AR2000EX, TA Instruments) for 2 h at 5000 s$^{-1}$ using a cone and plate geometry (1 degree, 40 mm). The temperature during the rheology experiments is controlled and kept at 25° C. The viscosity of this dispersion ($\eta_{dispersion}$) is the value measured at a shear rate of 10 s$^{-1}$ after the shearing step (iii).

The power-law exponent index of a 3 wt. % dispersion of the fumed silica is measured as follows: A dispersion of fumed silica (batch size=30 g) is prepared by (i) mixing the appropriate mass of silica in the mineral oil, (ii) mixing for 10 min in a dual asymmetric centrifuge-type mixer (e.g., DAC 150 FVZ, Flacktek), and (iii) shearing in a rheometer (AR2000EX, TA Instruments) for 2 h at 5000 s$^{-1}$ using a cone and plate geometry (1 degree, 40 mm). The temperature during the rheology experiments is controlled and kept at 25° C. The power-law exponent index is determined from the steady state flow curve obtained after shearing from 5000 s$^{-1}$ to 0.1 s$^{-1}$ and fitting the data to the Herschel-Bulkley model. The Herschel-Bulkley model is described in Macosko, C., *Rheology: Principles, Measurements and Applications*, VCH, New York, 1994, and used to characterize materials that behave like solids.

The elastic modulus of a 3 wt. % dispersion of the fumed silica is measured as follows. A dispersion of fumed silica (batch size=30 g) is prepared by (i) mixing the appropriate mass of silica in the mineral oil, (ii) mixing for 10 min in a dual asymmetric centrifuge-type mixer (e.g., DAC 150 FVZ, Flacktek), and (iii) shearing in a rheometer (AR2000EX, TA Instruments) for 2 h at 5000 s$^{-1}$ using a cone and plate geometry (1 degree, 40 mm). The temperature during the rheology experiments is controlled and kept at 25° C. The elastic modulus is determined from dynamic oscillatory shear experiments. Typically, a dynamic frequency sweep is run between 0.1 to 100 rad/s at a strain of less than 0.5% (within the linear viscoelastic regime, i.e., when stress and strain are linearly proportional). The elastic modulus is the value obtained at 10 rad/s.

The inventive fumed silica typically is in the form of a composition, which can be in any suitable form, e.g., a powder or a dispersion (such as in water), and which can have any suitable number of fumed silica particles, e.g., 1000 or more fumed silica particles, 2000 or more, 5000 or more, 1×10$^4$ or more, 1×10$^5$ or more, or 1×10$^6$ or more fumed silica particles, or any suitable amount of fumed silica particles, e.g., 1 g or more, 100 g or more, 1 kg or more, 10 kg or more, 100 kg or more, or 1000 kg or more.

The fumed silica described herein can be produced by the processes described herein. The invention provides a process of preparing such fumed silica. In particular, the inventive process comprises (a) providing a stream of a feedstock comprising a silica precursor, (b) providing a stream of combustible gas, (c) forming a stream of combusted gas with fumed silica particles suspended therein in a reactor, wherein the fumed silica particles comprise aggregates of primary particles, and wherein the aggregates are of a first aggregate size, by (c1) mixing the stream of the feedstock with the stream of combustible gas to form a stream of combustible gas with the silica precursor, and then combusting the stream of combustible gas with the silica precursor to form the stream of combusted gas with fumed silica particles having the first size suspended therein, (c2) combusting the stream of combustible gas to form a stream of combusted gas and then mixing the stream of the feedstock with the stream of the combusted gas to form a stream of combusted gas with the silica precursor suspended therein, which then forms fumed silica particles having the first aggregate size, or (c3) carrying out a combination of the foregoing items (c1) and (c2), (d) allowing contact among the fumed silica particles having the first aggregate size in the stream of combusted gas and either (d1) contacting the fumed silica particles having the first aggregate size with one or more dopants to modify surfaces thereof, (d2) controlling the temperature-time profile, or history, of the fumed silica particles having the first aggregate size to allow post-quench aggregate growth, (d3) introducing additional feedstock into the stream of combusted gas with the fumed silica particles having the first aggregate size suspended therein, or (d4) carrying out a combination of any of the foregoing items (d1), (d2), and (d3), thereby forming a stream of combusted gas with fumed silica particles having a second aggregate size suspended therein, the second aggregate size being larger than the first aggregate size, and (e) recovering the fumed silica particles having the second aggregate size from the stream of combusted gas.

The stream of a feedstock comprising a silica precursor can be formed in any suitable manner. The silica precursor can be any suitable silica precursor or combination of silica precursors. For example, the silica precursor can be a silicon halide that is converted to silica under the conditions of the inventive process. Suitable silica precursors include, but are not limited to, chlorosilanes, alkyl-chlorosilanes, siloxanes, or other substituted silanes.

The stream of combustible gas can be formed in any suitable manner. The combustible gas can be any suitable combustible gas or combination of combustible gases. The combustible gas typically includes a fuel and an oxidant. The fuel can be any suitable fuel, such as hydrogen ($H_2$), carbon monoxide (CO), and methane ($CH_4$). The fuel preferably is hydrogen or has a high content of hydrogen-containing components, such as light hydrocarbons. Suitable hydrocarbons include, but are not limited to, natural gas, methane, acetylene, alcohol, kerosene, and mixtures thereof. As used herein, the term "natural gas" refers to a mixture of methane ($CH_4$), ethane ($C_2H_6$), propane ($C_3H_8$), butane ($C_4H_{10}$), and nitrogen. In some forms, natural gas may further comprise relatively small amounts of helium. As utilized herein, the term "kerosene" refers to a mixture of petroleum hydrocarbons, which is obtained during the fractional distillation of petroleum. The oxidant can be any suitable oxidant, such as air and/or oxygen.

A diluent optionally can be combined with the silica precursor, fuel, and/or oxidant. The diluent typically comprises one or more substantially non-oxidizing or inert gases, such as nitrogen, carbon dioxide, argon, etc.

The stream of combustible gas is combusted, typically in a suitable apparatus, such as a reactor. The reactor can be of any suitable configuration. For example, any heated, cooled, or refractory-lined furnace with an optionally controlled quench system can be used. The combustion of the combustible gas results in the formation of a flame and stream of combusted gas flowing downstream of the flame. The stream of combustible gas results in a flame desirably having an adiabatic temperature of 1000° C. to 2200° C., preferably 1400° C. to 1900° C. U.S. Patent Application Publication 2004/0156773 A1, which is incorporated by reference herein, generally describes the process and equipment for producing fumed silica.

The stream of a feedstock comprising a silica precursor is combined with the stream of combustible gas, the stream of combusted gas, or both the stream of combustible gas and the stream of combusted gas. The silica precursor is in the form of either vapor or fine droplets (e.g., an aerosol) in the stream of a combustible gas and/or the stream of combusted gas and ultimately is subjected to a high temperature resulting from the combustion of the combustible gas, thereby converting the silica precursor to fumed silica particles that are suspended in the stream of combusted gas, wherein the fumed silica particles comprise aggregates of primary particles, and the aggregates are of a first size.

The inventive process allows contact among the fumed silica particles having the first aggregate size in the stream of combusted gas and provides for either (1) contacting the fumed silica particles with one or more dopants to modify surfaces thereof, (2) modifying the temperature-time profile, or history, of the fumed silica particles within the reactor, e.g., by introducing additional combustible gas into the stream of combusted gas with the fumed silica particles suspended therein, to provide for post-quench aggregate growth, (3) introduction of additional feedstock into the stream of combusted gas with the fumed silica particles suspended therein, or (4) a combination of any of the foregoing items (1), (2), and (3). In that manner, a stream of combusted gas with fumed silica particles having a second aggregate size suspended therein is formed, wherein the second aggregate size is larger than the first aggregate size.

The resulting fumed silica particles are recovered from the stream of combusted gas in any suitable manner. Typically, the fumed silica particles having the second aggregate size are cooled, e.g., by quenching with air or other gases.

The resulting fumed silica particles desirably represent one or more of the embodiments of the inventive fumed silica described herein. In other words, the resulting fumed silica has one or more of the characteristics of the fumed silica described herein. For example, the fumed silica has an aggregate size D (as measured by PCS, in units of nm) and a surface area SA (as measured by BET, in units of $m^2/g$) satisfying the formula: $D \geq 151+(5400/SA)+0.00054(SA-349)^2$. Alternatively, or in addition, the fumed silica has a surface area of 100-300 $m^2/g$, and wherein a 3 wt. % dispersion of the fumed silica in mineral oil exhibits at least one of (a) a viscosity at a shear rate of 10 $s^{-1}$ of 0.25 Pa·s or more, (b) a power-law exponent index over a shear rate range of 0.1 $s^{-1}$ to 5000 $s^{-1}$ that is 0.8 or less, and (c) an elastic modulus in a frequency range of from 0.1 rad/s to 100 rad/s that is 16-100 Pa.

In a first embodiment, the primary particles and/or aggregates of fumed silica are contacted with one or more dopants to modify the surfaces thereof. In a second embodiment, the temperature-time profile, or history, of the fumed silica particles is controlled such that the fumed silica/combusted gas mixture is partially quenched but then brought to or maintained at a temperature at which the fumed silica particles can continue to increase in aggregate size. The post-quench temperature can be achieved and/or maintained in a variety of ways, such as by introducing additional combustible gas at a suitable point downstream of the flame. In a third embodiment, additional feedstock is introduced at a suitable point downstream of the flame. The invention also contemplates combinations of any of the foregoing embodiments, e.g., (a) the use of both dopants and post-quench aggregate growth, (b) the use of both dopants and downstream introduction of feedstock, (c) the use of post-quench aggregate growth and the downstream introduction of feedstock, and (d) the use of dopants along with post-quench aggregate growth and the downstream introduction of feedstock.

In the process of the first embodiment, dopants are introduced into the flame or downstream of the flame. The dopants can be any suitable compounds, typically compounds of at least one element selected from the group consisting of Group IA elements, Group IIA elements, Group IVB elements, Group IIIA elements, and mixtures thereof. For example, the dopants may comprise, consist essentially of, or consist of lithium-, sodium-, potassium-, manganese-, calcium-, aluminum-, boron- or titanium-containing compounds, e.g., sodium- or titanium-containing compounds. While not wishing to be bound to any particular theory, it is believed that the dopants flux the surfaces of the existing particles, thereby causing local melting of the surfaces and allowing aggregates to fuse with one another, and/or otherwise promote fusion between the aggregates and formation of larger aggregates.

The dopants can be introduced by any suitable means at one or more suitable locations with respect to the main flame (e.g., the initial particle-producing flame). Thus, the dopants can contact the primary particles and aggregates suspended in the stream of combustion gas at any suitable point. For example, the dopants can be introduced (e.g., injected or otherwise fed) into the stream of the feedstock, the stream of the combustible gas, the mixture of the feedstock and combustible gas streams, a flame resulting from the combustion of the combustible gas, the stream of combusted gas, and/or a location downstream of the initial flame, which location can be adjusted to affect the aggregate size of the resulting fumed silica particles. If the reactor has a typical diameter $d_{reactor}$, then the dopant introduction typically is 1 $d_{reactor}$ to 10 $d_{reactor}$ downstream of the main flame, for a small (e.g., less than 10 $d_{reactor}$) flame, but the location is suitably adjusted depending on various factors such as the scale of the apparatus, the nature of the dopant, and the size of the flame. A flow reactor, whether or not it is cylindrical, can have a characteristic transverse dimension, such as a hydraulic diameter, and this dimension can be substituted for $d_{reactor}$ in scaling the position of downstream dopant introduction. The dopants can be introduced into the reactor coaxially, transversely, or tangentially. The amount of the dopants fed into the stream of combustible gas or the stream of combusted gas typically is 1 ppm to 100,000 ppm based on the weight of the fumed silica.

In the second embodiment, the temperature-time profile, or history, of the fumed silica/combusted gas mixture is controlled and desirably modified as compared to the conventional process to allow for post-quench aggregate growth. The temperature-time profile, or history, of the particles in the reactor is modified in order to keep the fumed silica aggregates hot enough to fuse together, thereby producing larger aggregates than are produced in a conventional process. This is in contrast to the conventional process, wherein the fumed silica and combusted gas mixture exits the flame region and then is allowed to cool to an arbitrary temperature by a combination of radiation, convection, and mixing with colder gas, as is well known in the art.

Specifically, in the second embodiment of the inventive process, the fumed silica/combusted gas mixture is first quenched, preferably to a temperature below 1700° C., preferably within approximately 100 milliseconds of the formation of the fumed silica. The temperature of the fumed silica/combusted gas mixture then is elevated to, or maintained at, a suitable temperature high enough to allow smaller silica aggregates to fuse together into larger aggregates in a temperature elevation/maintenance step. When the fumed silica is pure (i.e., not doped with other elements), this temperature that is high enough to allow smaller silica aggregates to fuse together into larger aggregates, i.e., the temperature facilitating post-quench aggregate growth, can be above 1000° C., for example, above 1350° C., but below 1700° C., and maintained for up to 2 seconds. When the fumed silica is doped with other elements, the temperature facilitating post-quench aggregate growth will differ depending on the nature and extent of the dopant(s). After this temperature elevation/maintenance step, the fumed silica/combusted gas mixture desirably is cooled to below 1000° C. within 2 seconds in order to halt the fusing process. Finally, the fumed silica/combusted gas mixture is further cooled, as necessary, to allow separation of the fumed silica particles from the stream of combusted gas, as is commonly practiced in the art.

The temperature and/or the duration of the temperature facilitating post-quench aggregate growth are adjusted so as to avoid sintering away more surface area than desired. The application of additional heat sinters away the surface area of the fumed silica to some extent, but if the material is held at high temperature for too long (the duration depends on the temperature), the final product is excessively reduced in surface area, and its aggregate size stays within the aggregate sizes of the population of conventional fumed silicas as shown in FIG. 1. The optimal time and temperature for the post-quench aggregate growth depends on the variation rate of sintering of the silica or the silica-dopant system with temperature. Without wishing to be bound by any particular theory, it is believed that the temperature utilized in the temperature elevation/maintenance step for post-quench aggregate growth should be barely sufficient to maintain the particles in a viscous state without coalescing faster than their collision rate.

The increase in aggregate size resulting from post-quench aggregate growth can be any suitable amount. For example, the aggregate size increase can be about 5% or more, about 10% or more, about 15% or more, or about 20% or more. Alternatively, or in addition, the increase in aggregate size as a percentage increase over the expected value for a conventional fumed silica of the same surface area as determined using line (b) in FIG. 1 can be about 5% or more, about 10% or more, about 15% or more, or about 20% or more.

The elevation or maintenance of the temperature for the post-quench aggregate growth can be achieved by at least one of (1) use of refractory insulation in the reactor to maintain the temperature of the stream of the combusted gas/fumed silica mixture for a desired period of time, (2) active heating of the reactor, e.g., the walls of the reactor, (3) introduction of additional combustible gas, and (4) introduction of cooling gas or liquid.

If additional combustible gas is used to elevate or maintain the temperature of the fumed silica/combusted gas mixture, then the additional combustible gas can be fed into the stream of combusted gas and fumed silica at any suitable point, or at multiple points, and in any suitable manner. When the additional combustible gas is ignited and combusted, the temperature of the aggregates of the fumed silica suspended in the stream of combusted gas is increased, thereby facilitating the fusion of the aggregates upon contact with each other in the stream of combusted gas. The position of the introduction and the temperature of the additional combustible gas can be adjusted depending on the desired aggregate size and final surface area of the resulting fumed silica particles.

When the introduction of combustible gas is the principal or only method used to provide post-quench aggregate control within the fumed silica/combusted gas mixture, then the most important process variables are (a) the temperature to which the initial mixture of combusted gas and fumed silica is allowed to cool before introduction of the additional combustible gas, (b) the adiabatic temperature increase caused by the introduction of additional combustible gas, (c) the initial burner adiabatic temperature, calculated from thermodynamic data in a manner well-known in the art, (d) the type of fuel used, and (e) in some situations, the estimated temperature of the particles after introduction of the combustible gas.

When the introduction of additional combustible gas is the principal method used to provide post-quench aggregate growth within the fumed silica/combusted gas mixture, then the additional combustible gas may need to be sufficient to produce an adiabatic temperature increase of at least 100° C., for example, 150° C. to 300° C., to ensure that enough heat is delivered to the fumed silica/combusted gas mixture to cause a significant increase in aggregate size. The optimal amount of adiabatic temperature increase depends on the temperature to which the fumed silica/combusted gas mixture is initially quenched. A smaller adiabatic temperature increase may be required if the initial drop in temperature is relatively small, thereby leading to a relatively high initial post-quench temperature. If an insulated refractory section is used instead of the introduction of additional combustible gas to provide a sufficient temperature for post-quench aggregate growth, then the adiabatic temperature increase is not applicable. Furthermore, if a combination of refractory insulation and the introduction of additional combustible gas is used to elevate or maintain the temperature of the fumed silica/combusted gas mixture, then the adiabatic temperature increase is less important, inasmuch as less additional heat is required to effect post-quench aggregate growth.

The additional combustible gas can be fed into the stream of combusted gas in an amount of 1% to 100% of a total mass of material in the stream of combusted gas. The additional combustible gas desirably comprises fuel and oxidant, as well as optionally diluent, wherein the fuel and oxidant may be in any suitable ratio, e.g., a stoichiometric ratio of oxidant to fuel, in the additional combustible gas, of between 0% and 300%, preferably 0% to 60%, and more preferably 5% to 40%. Preferably, the additional combustible gas contains hydrogen.

The additional combustible gas desirably is fed into the stream of combusted gas and fumed silica, so as to result in elevating the estimated post-introduction temperature of the mixture above a critical minimum value. When the fumed silica is pure (i.e., not doped), this minimum temperature is at least 600° C. and typically approximately 1000° C., e.g., between 1000° C. and 1350° C. The estimated post-introduction temperature is calculated by first calculating the adiabatic temperature of the initial fumed silica/combusted gas mixture, in a manner well-known in the art. Then, the estimated temperature before introduction is calculated by estimating the heat loss that occurs as the mixture proceeds to the additional combustible gas introduction point. This heat loss is estimated by fitting an appropriate function, which is an approximation of the heat transfer process in the reactor, to experimental reactor temperature measurements. Then, the maximum possible temperature increase, or adiabatic temperature increase, upon introduction of the fuel/air blend is calculated and added to the estimated temperature before additional combustible gas introduction to finally find the estimated post-introduction temperature. The adiabatic temperature increase can be calculated from the thermodynamic properties of the introduced fuel-air blend and the thermodynamic properties of the stream of combusted gas and fumed silica in a manner well-known in the art.

The additional combustible gas can be introduced by any suitable means at one or more suitable locations with respect to the main flame (e.g., the initial particle-producing flame). If the reactor has a typical diameter $d_{reactor}$, then the additional combustible gas introduction typically is 1 $d_{reactor}$ to 25 $d_{reactor}$ downstream of the main flame, more preferably 2.5 $d_{reactor}$ to 6 $d_{reactor}$ downstream of the main flame. A flow reactor, whether or not it is cylindrical, can have a characteristic transverse dimension, such as a hydraulic diameter, and this dimension can be substituted for $d_{reactor}$ in scaling the position of downstream introduction. The additional combustible gas can be introduced into the reactor coaxially, transversely, or tangentially.

In the third embodiment, a portion of the total amount of a feedstock is fed to the reactor at a suitable position downstream of the initial, fumed-silica-producing flame. The silica precursor reacts with the surface of the fumed silica particles produced from the flame, fusing them together into larger aggregates. The process also, under appropriate conditions, can lower the coefficient of structure of the final fumed silica aggregates. The amount of the additional feedstock introduced downstream may be between 10% and 75% of the total feedstock by mass, preferably between 10% and 50% on a mass basis. The additional feedstock can be introduced by any suitable means at one or more suitable locations with respect to the main flame (e.g., the initial particle-producing flame). If the reactor has a typical diameter $d_{reactor}$, then the additional feedstock introduction typically is 1 $d_{reactor}$ to 120 $d_{reactor}$ downstream, e.g., 2 $d_{reactor}$ to 24 $d_{reactor}$ downstream, of the main flame. A flow reactor, whether or not it is cylindrical, can have a characteristic transverse dimension, such as a hydraulic diameter, and this dimension can be substituted for $d_{reactor}$ in scaling the position of downstream introduction. The additional feedstock can be introduced along with additional combustible gas containing, for example, hydrogen-containing fuel, oxidant, and diluent. The additional feedstock can be introduced into the reactor coaxially, transversely or tangentially.

Process variables that can affect the increase in aggregate size include the relative amount of feedstock introduced downstream, the amount and type of fuel, if any, introduced with the additional feedstock, and the position of introduction. While not wishing to be bound to any particular theory, it is believed that the additional feedstock partially coats the existing fumed silica particles, thereby allowing fumed silica particles with loose connections to fuse together with stronger connections and ultimately produce larger aggregates.

A process variable that can effectively control the increase in aggregate size is the relative amount of feedstock introduced downstream. A greater proportion of feedstock fed downstream of the initial particle-producing flame provides a greater increase in the aggregate size, e.g., above the level expected for a conventional fumed silica of the same surface area. When a chlorosilane feedstock is used (e.g., silicon tetrachloride, trichlorosilane, or methyl-trichlorosilane), another process variable that can effectively control the aggregate size increase is the relative stoichiometry of hydrogen introduced with the chlorosilane, i.e., the introduced theoretical $H_2$ ratio (%) that can be defined as:

$$\text{introduced theoretical } H_2 = (\text{moles of } H_2 \text{ introduced})/(0.5 \times \text{moles of Cl atoms introduced}).$$

The introduced theoretical $H_2$ ratio represents the amount of introduced hydrogen available to react with the chlorine atoms of the introduced feedstock, relative to the amount required to react away all of the chlorine atoms in the introduced material. When the introduced theoretical $H_2$ ratio is above 100%, then enough hydrogen has been introduced to react with all of the introduced chlorine to form HCl. When the introduced theoretical $H_2$ ratio is less than 100%, then water vapor, present in the mixture of initial silica and combusted gas, must supply some of the hydrogen for converting the chlorine to HCl. Lower values of the introduced theoretical $H_2$ ratio promote more aggregate size growth.

The surface area of the initial fumed silica may increase or decrease after introduction of the additional feedstock downstream of the initial particle-producing flame, depending on the starting surface area and the introduced theoretical $H_2$ ratio. The surface area change does not depend on the amount of feedstock introduced downstream. Low starting surface areas usually yield a surface area increase (a negative surface area loss). Low values of the introduced theoretical $H_2$ ratio likewise increase the likelihood of a small surface area loss or a surface area increase.

In FIG. 3 and FIG. 4, the open triangle represents an example of fumed silica made by the inventive process utilizing the downstream introduction of a chlorosilane feedstock. The inventive process can produce fumed silica comprising much larger aggregates than conventional fumed silica having the same surface area, but with a $C_S$ value that is approximately equal to the $C_S$ value of the commercial fumed silica at the same surface area. In other words, the inventive process employing downstream introduction of the feedstock can increase the aggregate size independently of the surface area and Cs value.

Figure 9:
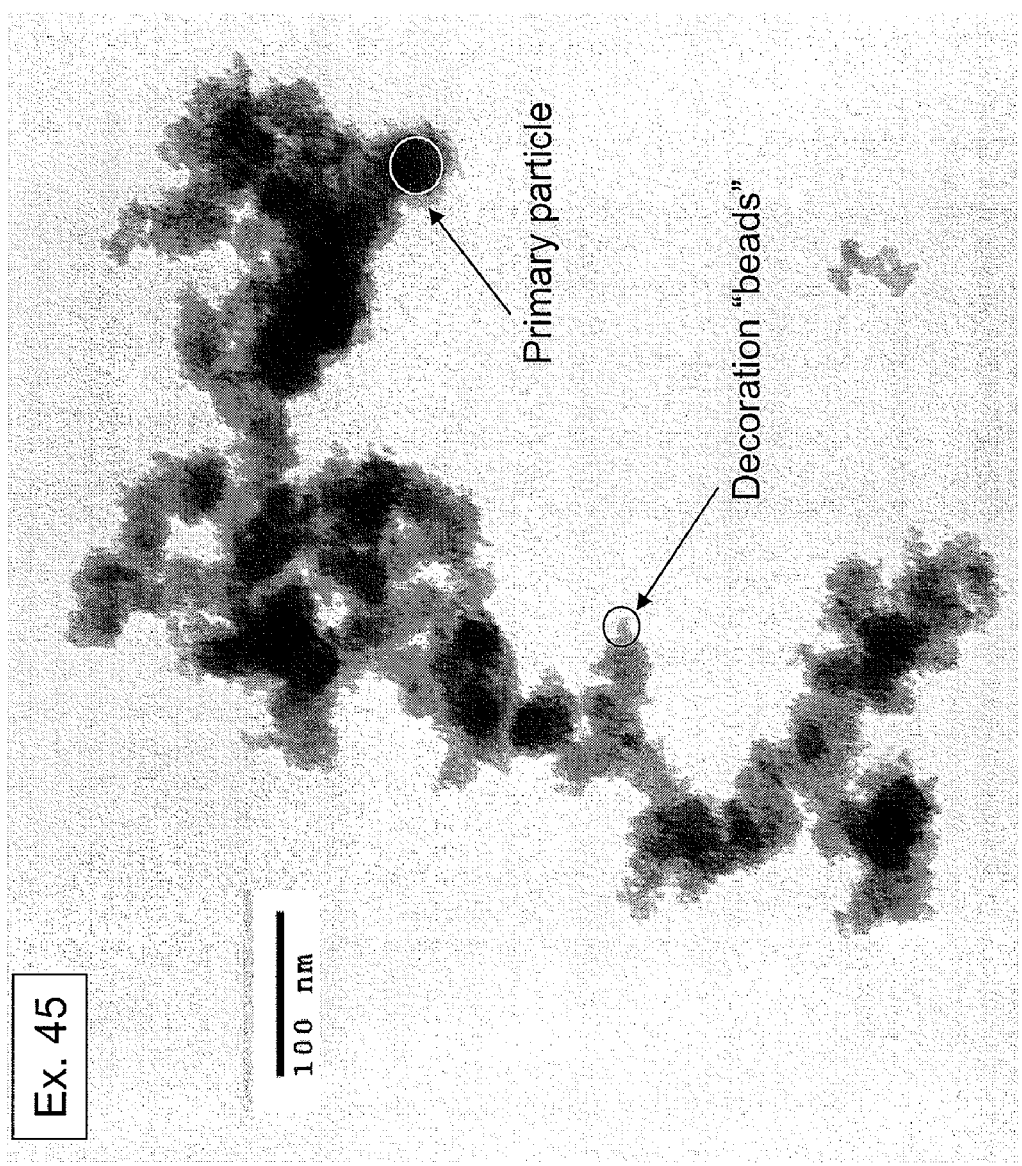
FIG. 9 is a first representative TEM image of an exemplary embodiment of inventive fumed silica produced according to Example 45.
Figure 10:
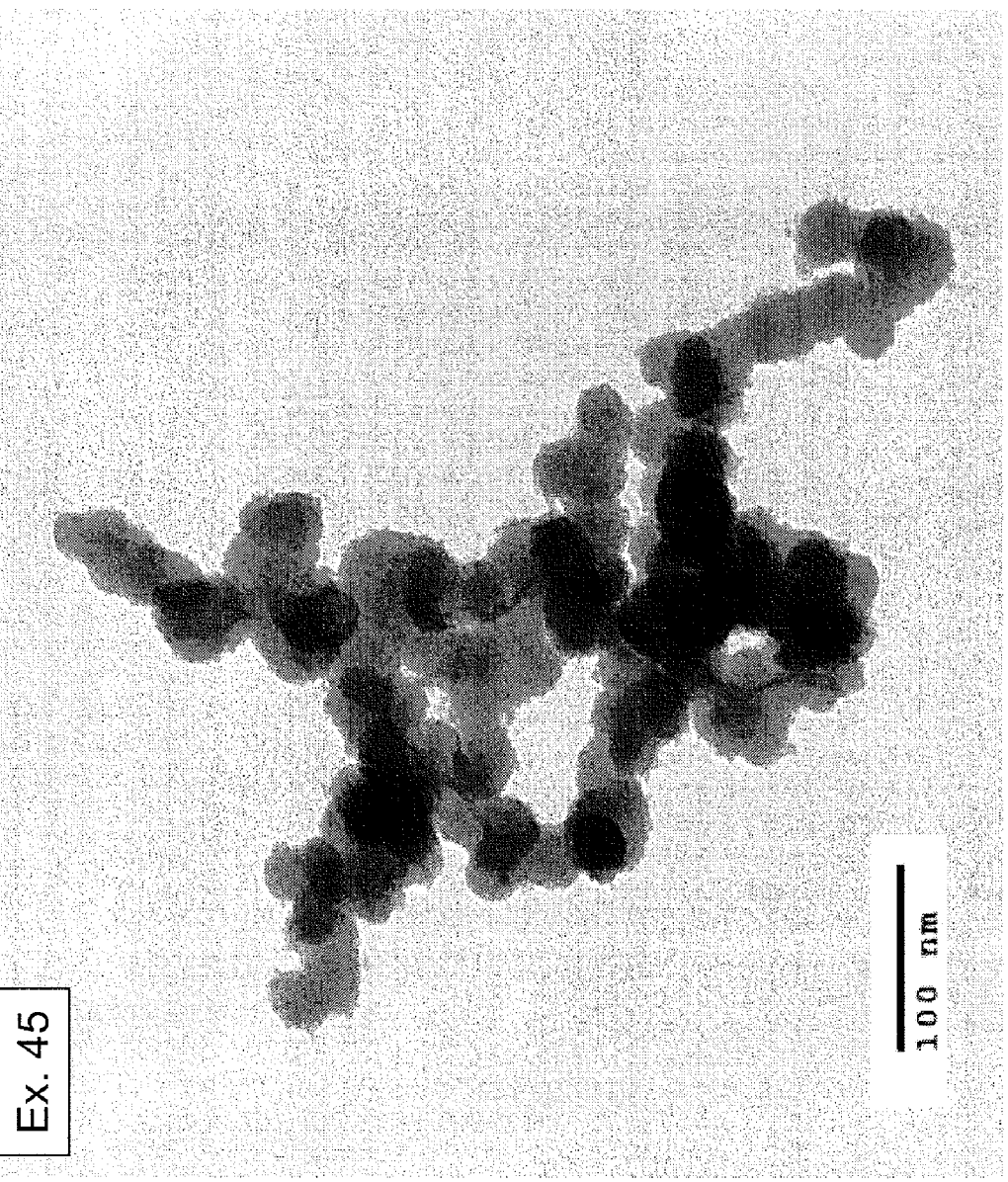
FIG. 10 is a second representative TEM image of an exemplary embodiment of inventive fumed silica produced according to Example 45.
Figure 11:
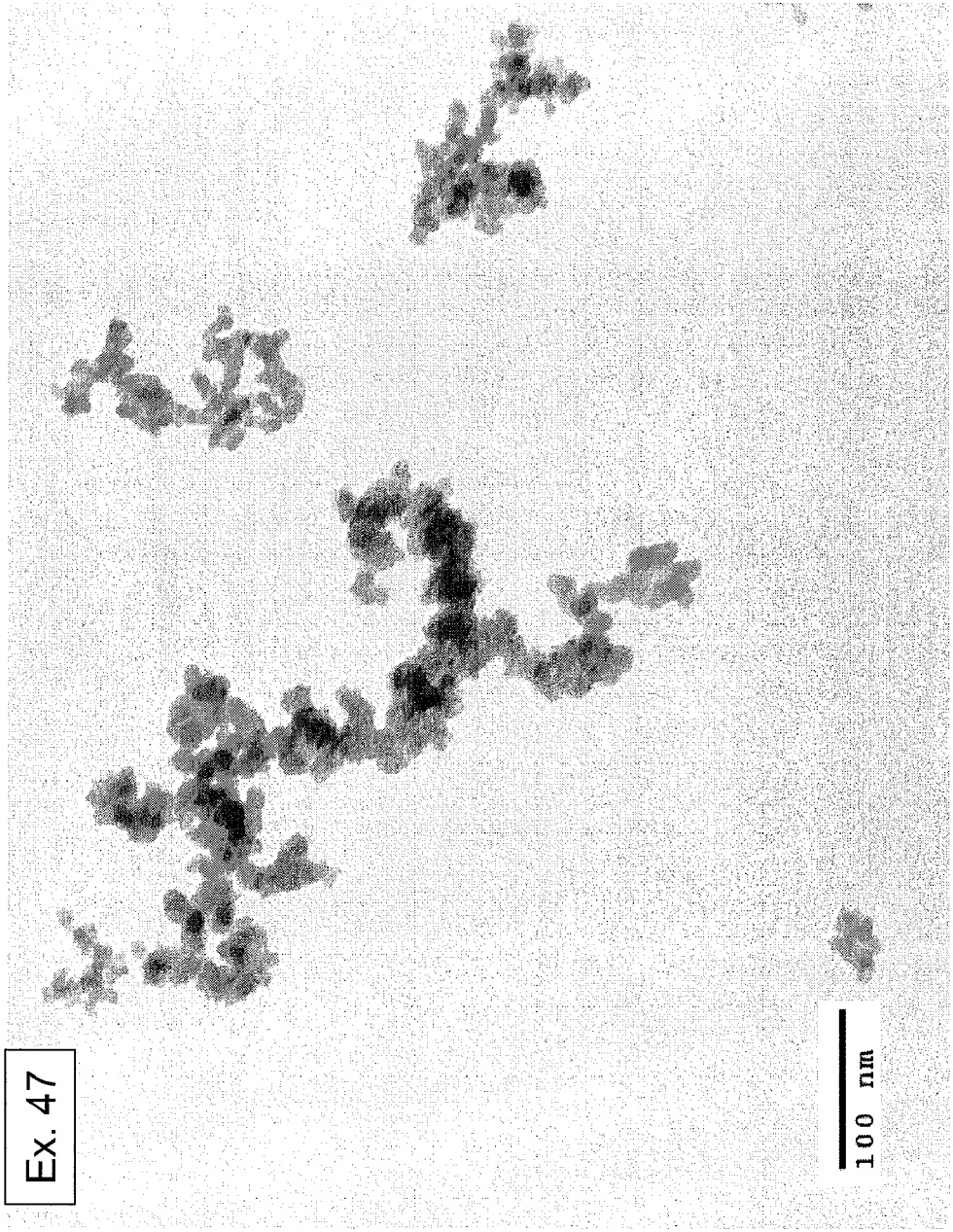
FIG. 11 is a TEM image of an exemplary embodiment of inventive fumed silica produced according to Example 47.
Figure 12:
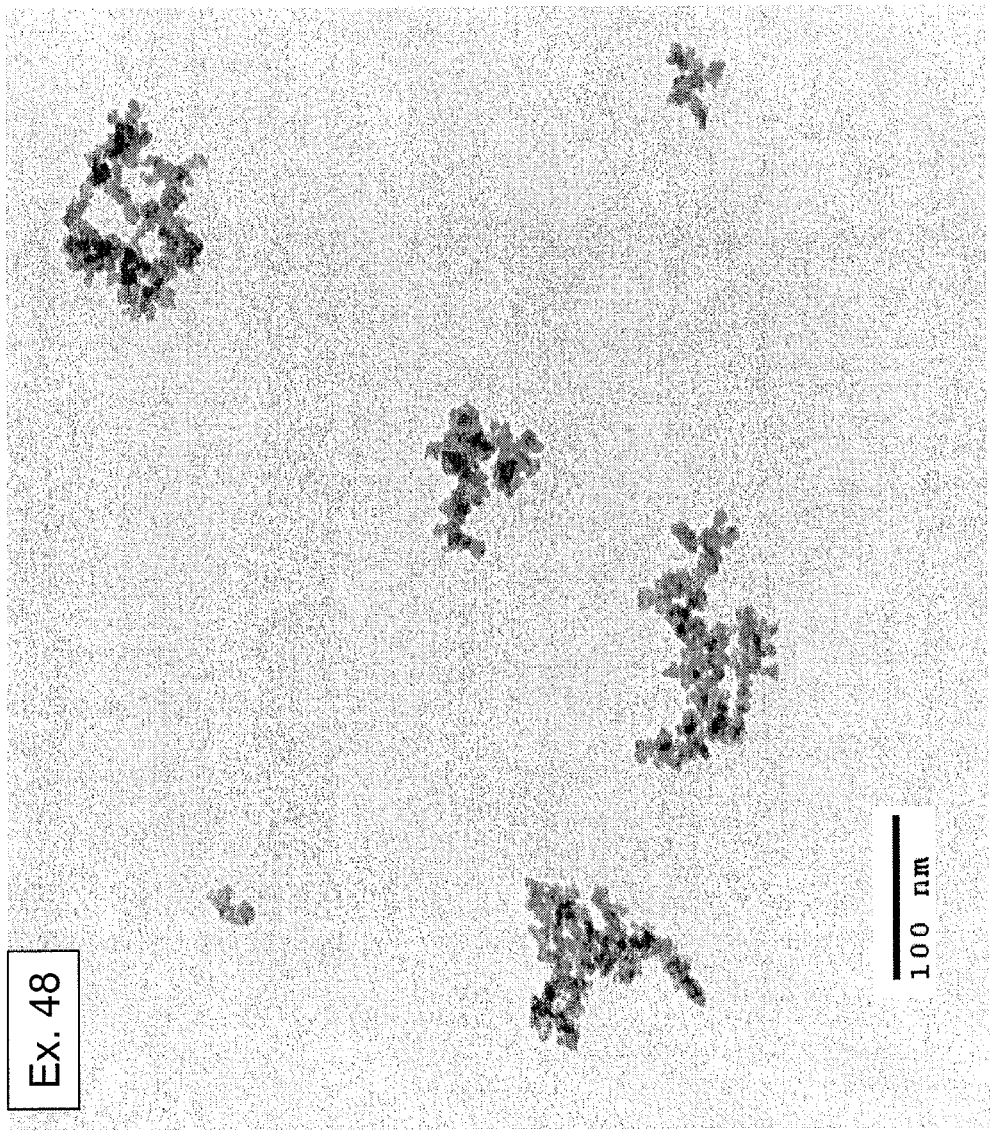
FIG. 12 is a TEM image of an exemplary embodiment of inventive fumed silica produced according to Example 48.
Figure 13:
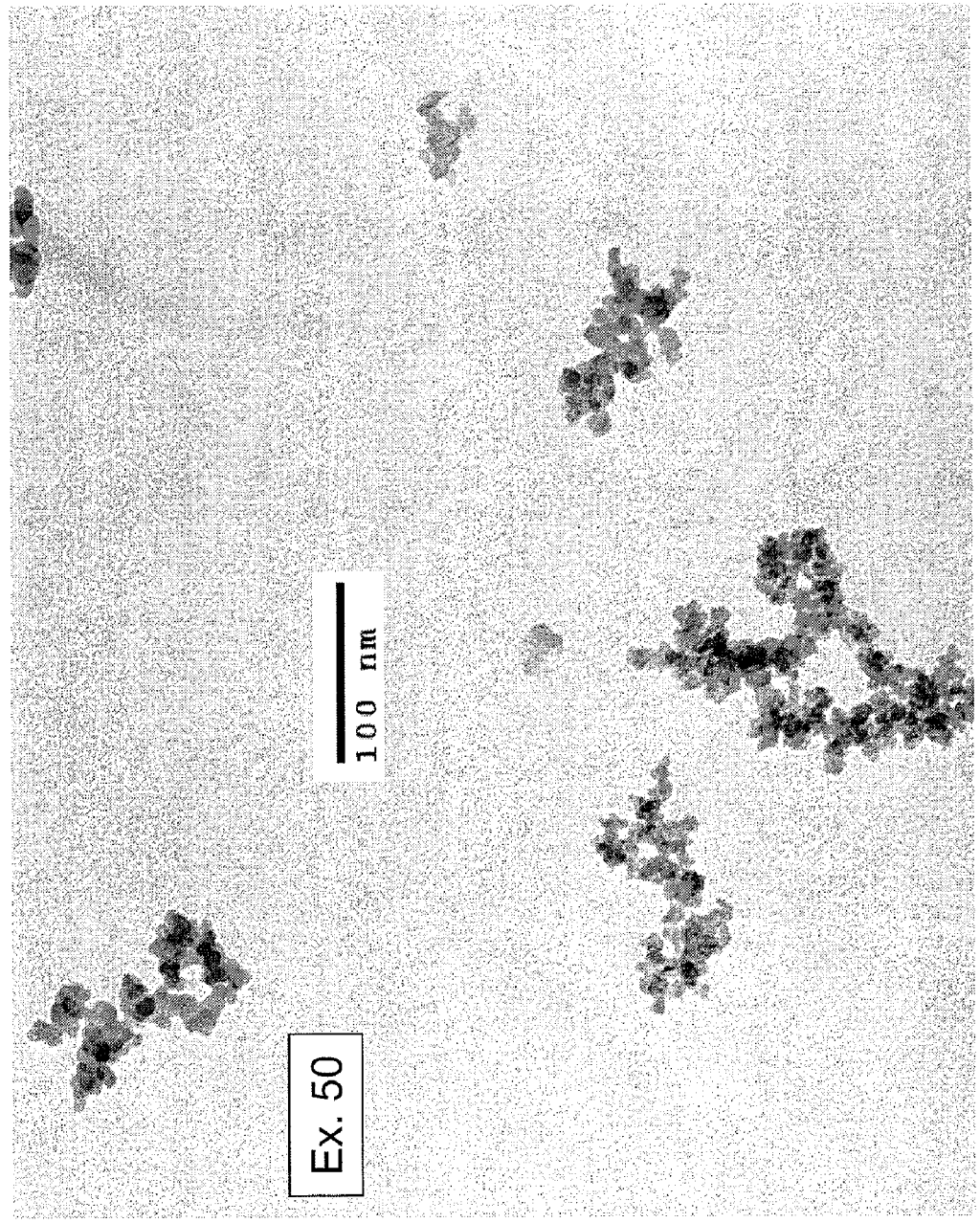
FIG. 13 is a TEM image of an exemplary embodiment of inventive fumed silica produced according to Example 50.

The process of the third embodiment can produce fumed silica comprising aggregates having at least two primary particle sizes (i.e., at least a bi-modal primary particle size distribution and including a multi-modal primary particle size distribution). Such fumed silica typically comprises larger primary particles with smaller primary particles attached to the larger primary particles, directly and/or through other smaller particles. FIGS. 9 and 10 are TEM images of such inventive fumed silicas. The circled portion of FIG. 9 shows that smaller primary particles, referred to as decoration beads, are attached to larger primary particles.

In particular, the fumed silica can have at least a bi-modal particle size distribution representing populations of particles having at least two different average primary particle sizes with a smallest average primary particle size and a largest primary particle size. The smallest average primary particle size can be about 0.05 or more, about 0.1 or more, about 0.15 or more, or about 0.2 or more times the largest average primary particle size. Alternatively, or in addition, the smallest average primary particle size can be about 0.5 or less, about 0.45 or less, about 0.4 or less, or about 0.3 or less times of the largest average primary particle size. Thus, the smallest average primary particle size relative to the largest average primary particle can be bounded by any two of the above endpoints. For example, the smallest average primary particle size can be about 0.5 to about 0.4 times, about 0.05 to about 0.3 times, or about 0.1 to about 0.45 times the largest average primary particle size.

The number ratio of the population of primary particles represented by the smallest average primary particle size to the population of primary particles represented by the largest average primary particle size with respect to the larger primary particles can be any suitable value. The number ratio of the population of primary particles represented by the smallest average primary particle size to the population of primary particles represented by the largest average primary particle size with respect to the larger primary particles can be about 1:1 or more, about 2:1 or more, about 3:1 or more, 5:1 or more, about 10:1 or more, or about 20:1 or more. Alternatively, or in addition, the number ratio of the population of primary particles represented by the smallest average primary particle size to the population of primary particles represented by the largest average primary particle size with respect to the larger primary particles can be about 50:1 or less, about 40:1 or less, about 30:1 or less, about 20:1 or less, or about 10:1 or less. Thus, the number ratio of the population of primary particles represented by the smallest average primary particle size to the population of primary particles represented by the largest average primary particle size with respect to the larger primary particles can be bounded by any two of the above endpoints. For example, the number ratio of the population of primary particles represented by the smallest average primary particle size to the population of primary particles represented by the largest average primary particle size with respect to the larger primary particles can be about 5:1 to about 40:1, 10:1 to about 50:1, or about 10:1 to about 30:1.

Such fumed silica can have a higher surface area and improved dispersibility, which is highly beneficial in various applications, as compared to fumed silica comprising aggregates not having at least two primary particle sizes (i.e., not having at least a bi-modal primary particle size). For example a chemical-mechanical polishing composition, useful in the polishing of substrates, especially semiconductor and electronic substrates, can beneficially comprise such fumed silica. Thus, the invention provides a chemical-mechanical polishing composition comprising the fumed silica of the invention dispersed in an aqueous medium. The chemical-mechanical polishing composition further can comprise an additive selected from the group consisting of oxidizing agents, surfactants, polymers, and mixtures thereof, as is known in the art.

Figure 14:
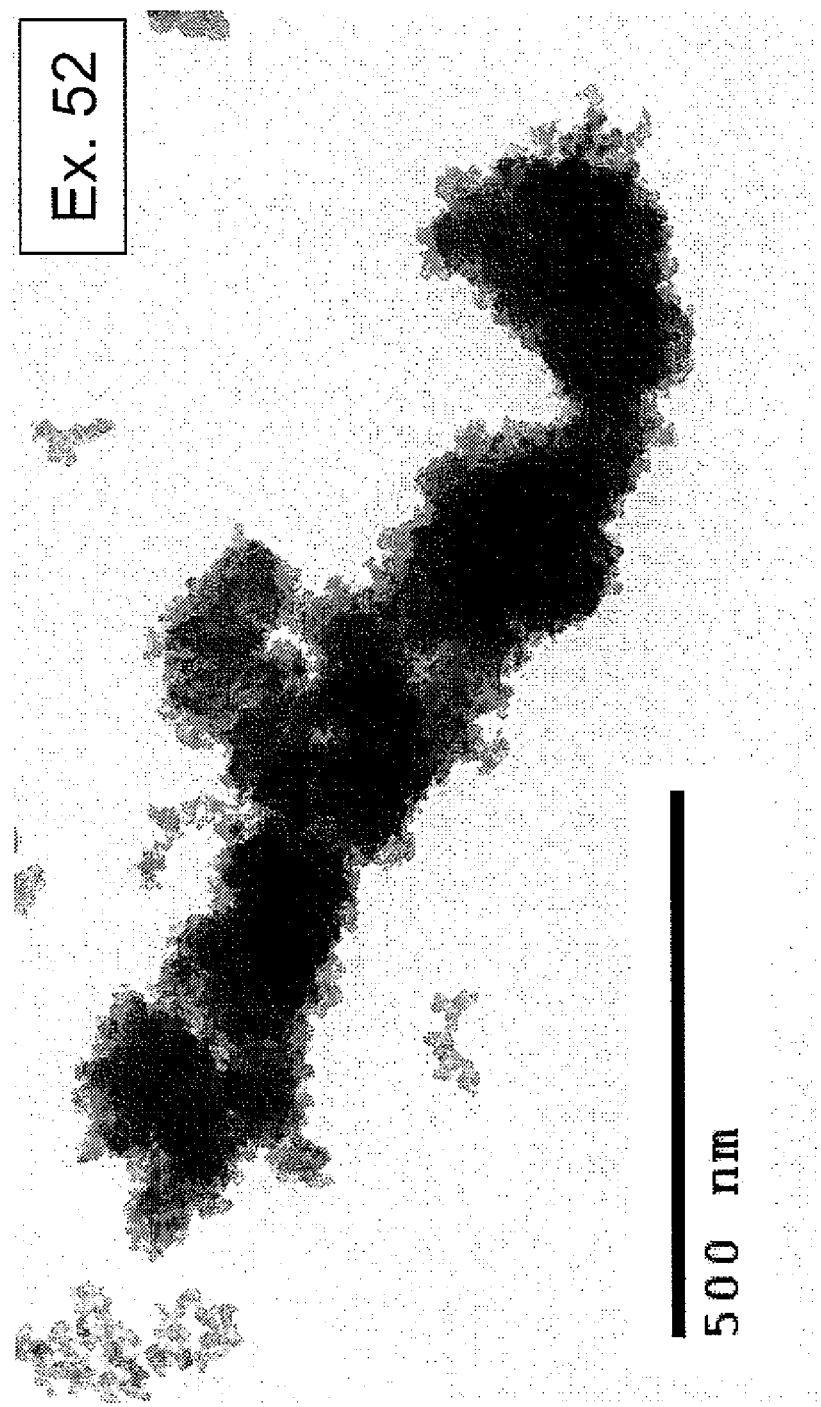
FIG. 14 is a TEM image of an exemplary embodiment of inventive fumed silica produced according to Example 52.

Such fumed silica comprising aggregates of primary particles, wherein the primary particles have at least a bi-modal particle size distribution representing populations of primary particles having at least two different average primary particle sizes, can be prepared using the process of the invention as demonstrated in Examples 45 and 52. FIGS. 9, 10, and 14 depict TEM images of the fumed silicas prepared in accordance with Examples 45 and 52 and clearly show that the resulting fumed silicas were fumed silicas comprising aggregates of primary particles, wherein the primary particles have at least a bi-modal particle size distribution representing populations of primary particles having at least two different average primary particle sizes. In contrast, FIGS. 8, 11, 12, and 13 depict TEM images of the fumed silicas prepared in accordance with Examples 44, 47, 48, and 50, which fumed silicas were not fumed silicas comprising aggregates of primary particles, wherein the primary particles have at least a bi-modal particle size distribution representing populations of primary particles having at least two different average primary particle sizes. Fumed silica comprising aggregates of primary particles, wherein the primary particles have at least a bi-modal particle size distribution representing populations of primary particles having at least two different average primary particle sizes, can be produced by selection of the appropriate process variables as is evident from a comparison of the aforementioned examples and the results thereof, such as a relatively large proportion of feedstock introduced downstream (e.g., more than 20%), a low introduced theoretical $H_2$ ratio (e.g., less than 100%), and/or a relatively low fumed silica starting (i.e., immediately prior to post-quench aggregate growth) surface area (e.g., less than 320 $m^2/g$).

The fumed silica of the invention can be used in any application in which conventional fumed silica is used in the art. Similarly, the inventive fumed silica can be treated in any suitable manner with any suitable treating agent(s) in the same manner as conventional fumed silica is treated in the art.

Fumed silica of the invention or made from the process of the invention can be used in dry or dispersion, typically aqueous, form depending on the end product application. For example, the fumed silica can be useful in typical applications including use as a filler in rubber and plastics, as a carrier material, as a catalytically active substance or support, as a base ceramic substance, in the electronic industry, in the cosmetic industry, as an additive in sealants, adhesives, paints, and coating, in other industries where rheology control is desired, and for heat protection stabilization.

When used in dispersion form, the fumed silica can be used in inkjet media applications, such as paper and cardboard, in the production of glass articles and optical fibers, and in chemical-mechanical polishing applications, such as those used in the fabrication of integrated circuits, rigid memory discs, and other substrates in the semiconductor and electronic industries. For example, when used to prepare a composition for a polishing application, the fumed silica can be slowly added to water to form a colloidal dispersion and then subjected to high shear mixing using conventional techniques. The pH of the dispersion typically is adjusted away from the isoelectric point to maximize colloidal stability. Suitable oxidizing components, surfactants, and/or polymers can be added to the composition to maximize polishing rates and selectivity while minimizing substrate defects resulting from polishing with the composition.

Furthermore, the fumed silica can be treated or functionalized in any suitable manner to render the fumed silica hydrophobic. The type of treating agent and level of treatment will vary depending upon the end product application, the desired degree of hydrophobicity, and other characteristics. Suitable treating agents include, for example, cyclic silazanes, organopolysiloxanes, organosiloxanes, organosilazanes, organosilanes, halogenorganopolysiloxanes, halogen organosiloxanes, halogenorganosilazanes, halogenorganosilanes, including those set forth and described in GB 2296915A, which is incorporated herein in its entirety by reference. Preferred treating agents include dimethyldichlorosilane, triethoxyoctylsilane, trimethoxyoctylsilane, hexamethyldisilazane, polydimethylsiloxane, and combinations thereof. As known to those skilled in the art, the treatment or functionalization of the fumed silica with a desired treating agent can use either dry or wet techniques employing conventional equipment.

The following examples further illustrate the invention, but, of course, should not be construed as in any way limiting its scope.

Examples 1-25

The effect of dopants on the aggregate size of fumed silica is demonstrated in Examples 1-25.

Various fumed silicas were produced in a laboratory scale process using the conditions recited in Tables 1-4. In particular, in each of Examples 1-25, a liquid silica precursor, hexamethyldisiloxane (HMDS), was fed to an atomizer. The precursor, or feedstock, was atomized into fine droplets using a nozzle and oxygen gas, in a process well-known in the art and similar to conventional fumed silica processes. The atomized feedstock was fed to a central burner, which was surrounded by a set of pilot burners. Methane and oxygen gas were fed to the pilot burners. Combustion of the pilot fuel provided additional heat to aid the combustion and particle formation processes in the central burner flame.

In Examples 1-4, no dopant was added to the process, such that Examples 1-4 served as comparative examples. In Examples 5-25, a dopant was blended with a carrier fuel. The dopant was titanium diisopropoxide bis(2,4-pentanedionate) ("TiDi") or sodium acetate ("NaAc"), and the carrier fuel was ethanol (EtOH). The dopant and carrier were atomized and introduced either into the central burner or at a specific location downstream of the flame (e.g., 15.0 cm downstream of the flame in Examples 11-15). The final dopant concentration was the mass ratio of dopant atoms (Ti or Na) to the mass of silica. In the examples, when the dopant was introduced downstream of the main flame, the dopant carrier was ethanol, and the ethanol flowrate typically was 2-4 ml/min through a pair of atomizing nozzles. The dopant-atomizing oxygen was supplied at a rate sufficient to atomize the dopant and carrier (8-10 L/min in the examples). In all examples, L/min refers to standard gas conditions (T=273 K, P=1.0135 bar).

The mass-average aggregate size and surface area of the resulting fumed silicas are shown in Tables 1-4. The results of Examples 5-25 are plotted in FIG. 2 as open-diamond points.

TABLE 1

| | | Example | | | | | | | |
|---|---|---|---|---|---|---|---|---|---|
| | | 1 | 2 | 3 | 4 | 5 | 6 | 7 | 8 |
| Feed Rates to Burner | | | | | | | | | |
| HMDSO Feed Rate | ml/min | 2.5 | 5.7 | 3.8 | 6.5 | 8.0 | 8.0 | 2.5 | 2.5 |
| Ethanol | ml/min | 22.5 | 19.3 | 21.2 | 18.5 | 17.0 | 17.0 | 22.5 | 22.5 |
| Atomizing Oxygen | L/min | 28.5 | 28.5 | 28.5 | 28.5 | 28.5 | 28.5 | 28.5 | 28.5 |
| Combustion Oxygen | L/min | 40.0 | 40.0 | 40.0 | 40.0 | 40.0 | 40.0 | 40.0 | 40.0 |
| Pilot Oxygen | L/min | 4.0 | 4.0 | 4.0 | 4.0 | 4.0 | 4.0 | 4.0 | 4.0 |
| Pilot CH$_4$ | L/min | 2.0 | 2.0 | 2.0 | 2.0 | 2.0 | 2.0 | 2.0 | 2.0 |
| Dopant Feed | | | | | | | | | |
| Dopant | | None | None | None | None | TiDi | TiDi | NaAc | NaAc |
| Carrier | | None | None | None | None | EtOH | EtOH | EtOH | EtOH |
| Introduction Position | cm | NA | NA | NA | NA | 0.0 | 0.0 | 0.0 | 0.0 |
| Final Dopant Concentration in Silica Product | ppm | None | None | None | None | 100000 | 50000 | 10000 | 100 |
| Surface Area | m$^2$/g | 220.4 | 170.2 | 189.8 | 147.0 | 99.4 | 89.8 | 204.9 | 156.6 |
| Aggregate Size | nm | 140.1 | 135.3 | 135.5 | 134.0 | 173.6 | 165.8 | 149.1 | 193.2 |

TABLE 2

| | | Example | | | | | | |
|---|---|---|---|---|---|---|---|---|
| | | 9 | 10 | 11 | 12 | 13 | 14 | 15 |
| Feed Rates to Burner | | | | | | | | |
| HMDSO Feed Rate | ml/min | 3.8 | 3.8 | 3.8 | 3.8 | 3.8 | 2.5 | 2.5 |
| Ethanol | ml/min | 21.2 | 21.2 | 21.2 | 21.2 | 21.2 | 22.5 | 22.5 |
| Atomizing Oxygen | L/min | 28.5 | 28.5 | 28.5 | 28.5 | 28.5 | 28.5 | 28.5 |
| Combustion Oxygen | L/min | 40.0 | 40.0 | 40.0 | 40.0 | 40.0 | 40.0 | 40.0 |
| Pilot Oxygen | L/min | 4.0 | 4.0 | 4.0 | 4.0 | 4.0 | 4.0 | 4.0 |
| Pilot $CH_4$ | L/min | 2.0 | 2.0 | 2.0 | 2.0 | 2.0 | 2.0 | 2.0 |
| Dopant Feed | | | | | | | | |
| Dopant | | NaAc | NaAc | NaAc | NaAc | NaAc | NaAc | NaAc |
| Carrier | | EtOH | EtOH | EtOH | EtOH | EtOH | EtOH | EtOH |
| Introduction Position | cm | 0.0 | 0.0 | 15.0 | 15.0 | 15.0 | 15.0 | 15.0 |
| Final Dopant Concentration in Silica Product | ppm | 10000 | 100 | 100 | 10000 | 100 | 10000 | 100 |
| Surface Area | m$^2$/g | 171.9 | 149.8 | 159.4 | 169.7 | 144.9 | 191.8 | 162.3 |
| Aggregate Size | nm | 160.5 | 181.6 | 158.2 | 144.2 | 171.1 | 146.7 | 168.6 |

TABLE 3

| | | Example | | | | |
|---|---|---|---|---|---|---|
| | | 16 | 17 | 18 | 19 | 20 |
| Feed Rates to Burner | | | | | | |
| HMDSO Feed Rate | ml/min | 3.1 | 3.1 | 3.1 | 3.1 | 3.1 |
| Ethanol | ml/min | 8.0 | 8.0 | 8.0 | 8.0 | 8.0 |
| Atomizing Oxygen | L/min | 22 | 22 | 22 | 22 | 22 |
| Combustion Oxygen | L/min | 23 | 23 | 23 | 23 | 23 |
| Pilot Oxygen | L/min | 4 | 4 | 4 | 4 | 4 |
| Pilot $CH_4$ | L/min | 2 | 2 | 2 | 2 | 2 |
| Dopant Feed | | | | | | |
| Dopant | | TiDi | TiDi | TiDi | TiDi | TiDi |
| Carrier | | EtOH | EtOH | EtOH | EtOH | EtOH |
| Introduction Position | cm | 0 | 15.24 | 0 | 15.24 | 7.5 |
| Final Dopant Concentration in Silica Product | wt. % | 10 | 10 | 0.1 | 0.1 | 1 |
| Surface Area | m$^2$/g | 133 | 164.5 | 122.2 | 213.8 | 177.7 |
| Aggregate Size | nm | 186 | 190.4 | 195.9 | 167.5 | 181.9 |

TABLE 4

| | | Example | | | | |
|---|---|---|---|---|---|---|
| | | 21 | 22 | 23 | 24 | 25 |
| Feed Rates to Burner | | | | | | |
| HMDSO Feed Rate | ml/min | 3.1 | 3.1 | 3.1 | 3.1 | 3.1 |
| Ethanol | ml/min | 8.0 | 8.0 | 8.0 | 8.0 | 8.0 |
| Atomizing Oxygen | L/min | 22 | 22 | 22 | 22 | 22 |
| Combustion Oxygen | L/min | 23 | 23 | 23 | 23 | 23 |
| Pilot Oxygen | L/min | 4 | 4 | 4 | 4 | 4 |
| Pilot $CH_4$ | L/min | 2 | 2 | 2 | 2 | 2 |
| Dopant Feed | | | | | | |
| Dopant | | TiDi | TiDi | TiDi | TiDi | TiDi |
| Carrier | | EtOH | EtOH | EtOH | EtOH | EtOH |
| Introduction Position | cm | 0 | 15 | 0 | 15 | 7.5 |
| Final Dopant Concentration in Silica Product | wt. % | 10 | 10 | 0.1 | 0.1 | 1 |
| Surface Area | m$^2$/g | 155.8 | 222.9 | 225 | 192.1 | 242.7 |
| Aggregate Size | nm | 191.4 | 182.7 | 181.9 | 190 | 165.8 |

As shown in Tables 1-4, the fumed silicas of Examples 5-25, which were prepared by the inventive process employing the use of dopants, were characterized by larger aggregates than the fumed silicas of Examples 1-4, which were prepared by a conventional process that did not employ the use of dopants. In particular, a comparison of the results of these examples shows that the presence of a dopant provides for production of fumed silica with an increased aggregate size at a given surface area. Also, the type of dopant varies the degree of increase in the aggregate size. In the examples, Ti-dopant was much more effective than Na-dopant. A desired aggregate size can be obtained by finely adjusting the process variables as well as the proper selection of the dopant. The position of the dopant introduction also can affect the ultimate aggregate size of the resulting fumed silica. For example, when Na-dopant was used, moving the introduction point downstream decreased the aggregate size of the resulting fumed silica.

Examples 26-31

The effect of the process variables during post-quench aggregate growth on the ultimate aggregate size of the fumed silica product is demonstrated in Examples 26-29.

The mass-average aggregate size and surface area for the resulting silicas are shown in Table 5. The increase in aggregate size is the percentage increase over the expected value for a conventional fumed silica of the same surface area as determined using line (b) in FIG. 1.

TABLE 5

|  |  | Example |  |  |  |  |  |
|---|---|---|---|---|---|---|---|
|  |  | 26 | 27 | 28 | 29 | 30 | 31 |
| Process Variables |  |  |  |  |  |  |  |
| Burner Adiabatic Temperature | °C. | 1930 | 1700 | 1540 | 1670 | 1530 | 1520 |
| Estimated Temperature Before Introduction of Additional Combustible Gas | °C. | 1930 | 1700 | 1540 | 1350 | 1280 | 1230 |
| Adiabatic Temperature Increase on Introduction of Additional Combustible Gas | °C. | 120 | 160 | 190 | 150 | 250 | 240 |
| Additional Combustible Gas Blend |  |  |  |  |  |  |  |
| Hydrogen | vol. % | 58 | 45 | 48 | 55 | 55 | 55 |
| Air | vol. % | 42 | 55 | 52 | 45 | 45 | 45 |
| Additional Combustible Gas Introduction Point | $d_{reactor}$ | 0.25 | 0.25 | 0.25 | 3.3 | 3.3 | 5.1 |
| Resulting Fumed Silica |  |  |  |  |  |  |  |
| Surface Area | $m^2/g$ | 125 | 162 | 246 | 250 | 270 | 296 |
| Aggregate Size | nm | 198 | 190 | 175 | 180 | 228 | 200 |
| Aggregate Size Increase | % | 1.5 | 8 | 23 | 28 | 54 | 38 |

In these examples, the introduction of additional combustible gas was the principal method for maintaining the temperature of the fumed silica/combusted gas mixture at an appropriate level. These examples illustrate the importance of first cooling the fumed silica below approximately 1700° C. before employing a method to elevate or maintain the temperature of the fumed silica to produce the desired aggregate growth.

In these examples, various fumed silicas were produced using the process conditions shown in Table 5. The process of preparing the fumed silicas involved a flame that burned a mixture of chlorosilane feedstock, hydrogen, and air, as well as the downstream introduction of additional combustible gas, which was a fuel/air mixture. The reactor diameter was 250 mm, and the introduction of the additional combustible gas was effected at different points downstream of the main flame of the burner as shown in Table 5. In Examples 26-28, the additional combustible gas was introduced by coaxial injection into the annular gap, or ring, surrounding the main burner, with estimated mixture of the additional combustible gas with the combusted gas stream approximately 1 burner diameter (65 mm) after the main flame. In Examples 29-31, the additional combustible gas was introduced by transversely injecting the additional combustible gas, i.e., perpendicular to the axis of the reactor.

The burner adiabatic temperature was calculated in the manner known in the art, from the thermodynamic data of the feedstock, hydrogen, and air supplied to the main burner. The estimated temperature before introduction of the fuel/air mixture was calculated by assuming an exponential decay in temperature from the adiabatic mixing temperature of the burner gases and additional quench gas supplied in an annulus around the burner, which then was fit to temperature measurements inside the reactor. The fitted expression then was evaluated at the point of introduction, to yield the estimated temperature before introduction. The adiabatic temperature increase is as described previously herein.

The results provided in Table 5 demonstrate the desirability in the inventive process of allowing the initial mixture of combusted gas and fumed silica to cool below 1700° C. In Examples 26 and 27 where cooling prior to additional combustible gas introduction was not below 1700° C., the increase in aggregate size compared to the aggregate size expected for the surface area (given line (b) in FIG. 1) was much less than in Examples 28-31 where cooling prior to additional combustible gas introduction was below 1700° C.

Examples 32-36

Examples 32-34 illustrate the effect of the degree of adiabatic temperature increase on the aggregate size of the resultant fumed silica when the introduction of additional combustible gas is the principal method for elevating the temperature of the initial fumed silica/gas mixture and the initial quench temperature is between 1200° C. and 1350° C.

For these examples, various fumed silicas were produced using the same processes used to produce the fumed silicas of Examples 26-31 except as otherwise shown in Table 6. The mass-average aggregate size and surface area for the resulting fumed silicas are shown in Table 6. The increase in aggregate size is the percentage increase over the expected value for a conventional fumed silica of the same surface area as determined using line (b) in FIG. 1.

TABLE 6

|  |  | Example |  |  |  |  |
|---|---|---|---|---|---|---|
|  |  | 32 | 33 | 34 | 35 | 36 |
| Process Variables |  |  |  |  |  |  |
| Burner Adiabatic Temperature | °C. | 1650 | 1650 | 1660 | 1540 | 1460 |
| Estimated Temperature Before Introduction of | °C. | 1340 | 1280 | 1350 | 1280 | 1200 |

TABLE 6-continued

| | | Example | | | | |
|---|---|---|---|---|---|---|
| | | 32 | 33 | 34 | 35 | 36 |
| Additional Combustible Gas Adiabatic Temperature Increase on Introduction of Additional Combustible Gas | ° C. | 100 | 100 | 150 | 70 | 170 |
| Estimated Post-Introduction Temperature | ° C. | 1440 | 1380 | 1500 | 1350 | 1370 |
| Additional Combustible Gas Blend | | | | | | |
| Hydrogen | vol. % | 55 | 55 | 55 | 55 | 55 |
| Air | vol. % | 45 | 45 | 45 | 45 | 45 |
| Resulting Fumed Silica | | | | | | |
| Surface Area | m²/g | 285 | 354 | 250 | 386 | 389 |
| Aggregate Size | nm | 166 | 161 | 180 | 157 | 166 |
| Aggregate Size Increase | % | 13 | 11 | 18 | 14.5 | 22 |

In Examples 32 and 33, the adiabatic temperature was increased by 100° C., as compared to an increase in the adiabatic temperature of 150° C. in Example 34. Based on these results, it is desirable to increase the adiabatic temperature by more than 100° C. in order to achieve the aggregate growth beyond approximately 15%. However, with a different combination of techniques in this embodiment, e.g., a higher initial quench temperature or the use of a refractory furnace in combination with the introduction of additional combustible gas, this minimum adiabatic temperature increase could be lower. In other words, in these examples, an adiabatic temperature increase greater than 100° C. is useful to produce significantly larger aggregates, but differences in reactor configuration or implementation could change this minimum value. The final surface area of the fumed silica can be varied by adjusting the burner adiabatic temperature and the degree of the adiabatic temperature increase.

Without wishing to be bound by any particular theory, from physical arguments concerning the sintering rate of fumed silica, and from operational experience, it is believed that some minimum post-introduction temperature is required to achieve aggregate growth in this embodiment. If that were not so, then procedures frequently practiced in the art, such as drying or calcining fumed silica, which raise the actual temperatures of silica from a starting point of approximately 50-100° C. up to 600° C., would produce varying changes in the aggregate size-surface area relationship. Since these procedures do not affect the relatively narrow ranges of aggregate size and surface area that characterize conventional fumed silicas, it is believed that there is some minimum post-introduction temperature, which is above 600° C. A comparison of Examples 35 and 36 sought to define this temperature for the case of pure (i.e., undoped) fumed silica. In Example 35, the estimated post-introduction temperature of the fumed silica is 1350° C., and the aggregate size increase was less than 15%. In Example 36, the estimated temperature of the fumed silica was 1370° C., and the aggregate size increase was 22%. However, in Example 35, the increase in adiabatic temperature also was relatively low, which may be the reason for the relatively low aggregate size increase. Therefore, the results of these examples suggest that the minimum post-injection temperature is at least 1000° C. and near or below 1350° C. Based on these results and on other operating experience, it is believed that it is desirable to adjust the process variables to raise the estimated post-introduction temperature above approximately 1350° C. in the case of undoped fumed silica.

In addition, the minimum post-introduction temperature required to achieve significant aggregate size increase varies depending on the type of the introduced fuel blend. For example, when $CH_4$ is used instead of $H_2$, or when a diluent is used, the temperature can be considerably higher than 1350° C. Furthermore, if a dopant lowers the melting or sintering temperature of the silica, then the minimum post-introduction temperature required to produce significant aggregate growth also will decrease.

Examples 37-42

Examples 37-42 illustrate the effects of starting surface area, which correlates directly with burner adiabatic temperature, and the adiabatic temperature increase on the final aggregate size of the fumed silica.

Various fumed silicas were produced using the same processes used to produce the fumed silicas of Examples 26-31 except as otherwise shown in Table 7. The starting surface area depends only on the burner adiabatic temperature, so that these process variables can be considered interchangeable. The specific relationship between burner adiabatic temperature and starting surface area depends on the specific burner design and the type of cooling or quench gas used in the process. These examples involved the use of the same burner type and quench gas conditions as all other examples of this embodiment.

The mass-average aggregate size, surface area, and surface area loss, and aggregate size increase for the resulting silicas are shown in Table 7. The phrase "surface area loss" refers to the amount (in m²/g) that the silica surface area falls as a result of the introduction of combustible gases, while the phrase "aggregate size increase" is the increase over the expected value for a conventional fumed silica of the same surface area as determined using line (b) in FIG. 1.

TABLE 7

| | | Example | | | | | |
|---|---|---|---|---|---|---|---|
| | | 37 | 38 | 39 | 40 | 41 | 42 |
| Process Variables | | | | | | | |
| Burner Adiabatic Temperature | ° C. | 1470 | 1529 | 1665 | 1467 | 1538 | 1665 |
| Starting Surface Area | m²/g | 470 | 410 | 280 | 470 | 410 | 280 |
| Adiabatic Temperature Increase on Introduction of Additional Combustible Gas | ° C. | 149 | 149 | 149 | 250 | 250 | 226 |
| Additional Combustible Gas Blend | | | | | | | |
| Hydrogen | vol. % | 55 | 55 | 55 | 55 | 55 | 55 |

TABLE 7-continued

| | | Example | | | | | |
|---|---|---|---|---|---|---|---|
| | | 37 | 38 | 39 | 40 | 41 | 42 |
| Air | vol. % | 45 | 45 | 45 | 45 | 45 | 45 |
| Additional Combustible Gas Introduction Position | $d_{reactor}$ | 3.3 | 3.3 | 3.3 | 3.3 | 3.3 | 3.3 |
| Resulting Fumed Silica | | | | | | | |
| Surface Area Loss | m²/g | 95 | 73 | 30 | 185 | 134 | 90 |
| Aggregate Size Increase | nm | 29 | 30 | 28 | 56 | 67 | 64 |
| Surface Area | m²/g | 375 | 339 | 250 | 287 | 268 | 191 |
| Aggregate Size | nm | 167 | 171 | 180 | 202 | 217 | 230 |

The results of Examples 37-42 demonstrate that, when the process conditions are such that the initial mixture of combusted gas and fumed silica is allowed to cool below 1700° C., the temperature then is raised to or maintained at above a threshold temperature, e.g., approximately 1350° C., for example, by raising the adiabatic temperature more than 100° C., then the ultimate degree of aggregate growth depends largely on the adiabatic temperature increase and the initial surface area of the silica before its temperature is elevated. The additional heat causes a loss, or drop, in the initial surface area, but also allows the aggregates to grow, thereby resulting in an aggregate whose size is large compared to conventional aggregates at its ultimate surface area. The examples demonstrate that the surface area loss depends on the starting surface area and the adiabatic temperature increase and that the increase in aggregate size depends on the adiabatic temperature increase.

Figure 7:
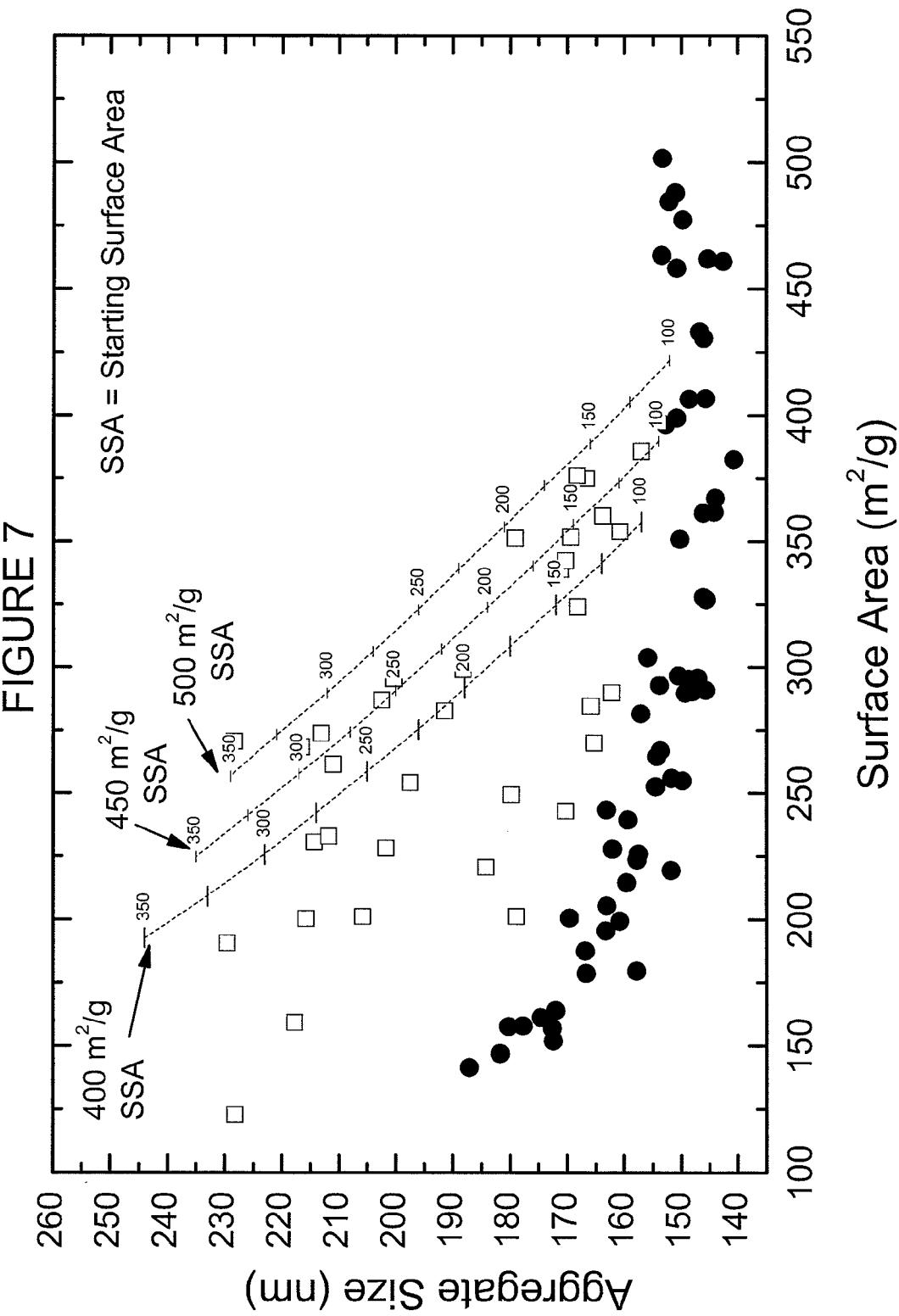
Figure 8:
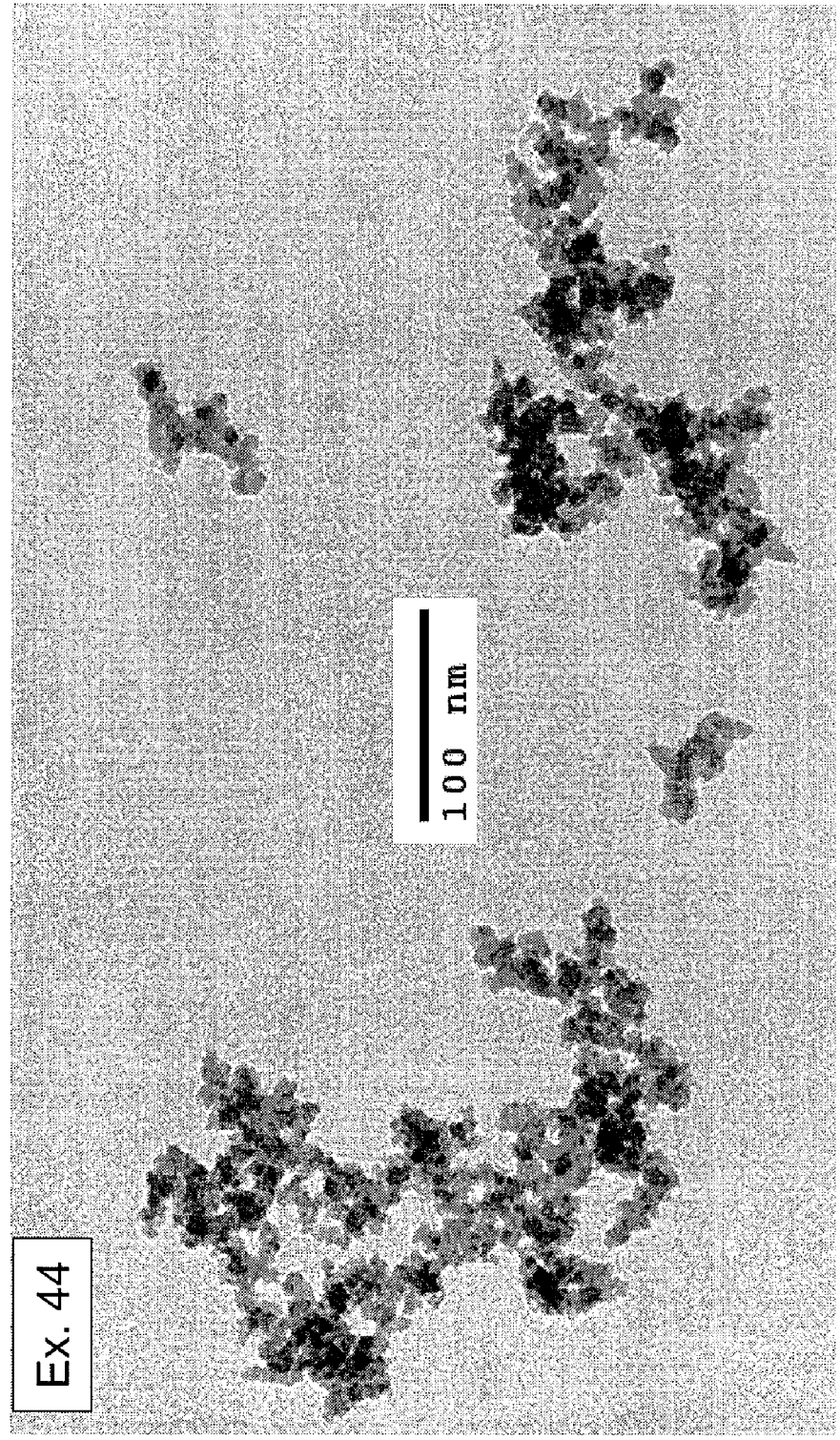
FIG. 8 is a TEM image of an exemplary embodiment of inventive fumed silica produced according to Example 44.

The result of these two process variables on the ultimate aggregate size and surface area also is illustrated in FIG. 7. The graphed points illustrate the aggregate size and surface area for exemplary conventional fumed silicas (solid circles) and for fumed silicas produced in accordance with the inventive process employing post-quench aggregate growth (open squares). The dashed-line curves are fits from the process data (which includes Table 7), and represent predicted final aggregate sizes and surface areas, given the amount of heat applied as degrees of adiabatic temperature increase (indicated by horizontal tick marks and numbers on the lines) and the starting surface area. At the start of the process, the initial silica has a surface area termed the starting surface area and an aggregate size that corresponds to it, within the range of surface areas and aggregate sizes of conventional fumed silicas (solid circles). As the adiabatic temperature increases, the surface area of the fumed silica decreases, and aggregate size increases from this starting point along a curve parallel to the dashed line curves, according to the degrees of adiabatic temperature increase. If, for example, the starting surface area of the fumed silica is 400 m²/g, the final product's position in FIG. 7 will move up the left-most curve according to the degrees of adiabatic temperature increase used. All of these data are obtained from the use of a 55%/45% volumetric blend of $H_2$ and air for the additional combustible gas.

Other process variables important to this embodiment include the fuel blend and the position where the additional combustible gas is introduced. In general, a blend of hydrogen and air or oxygen is preferable. Using $N_2$ in place of air and/or a hydrocarbon fuel in place of $H_2$ may give a less effective process (less aggregate growth for the amount of heat added). The range of effective positions for introduction depends on the cooling rate of the initial mixture of silica and combusted gas. For a given cooling rate, the position of the introduction downstream of the main flame is kept within a range such that the silica has time to cool to below 1700° C., but the estimated post-introduction temperature will still be above approximately 1350° C. The cooling rate is highly specific to the reactor design and the technique used to cool the initial flame. The range of appropriate positions for the additional combustible gas introduction, therefore, can differ depending on the reactor. In the reactor system used for the examples, the effective range is 1 $d_{reactor}$ to at least 10 $d_{reactor}$. If the additional combustible gas introduction position is within the effective range, then moving the position of the additional combustible gas introduction farther downstream will offer a slight improvement in aggregate growth, other conditions being the same. In a reactor configuration other than the reactor configuration used for these examples, e.g., in a reactor having a longer refractory portion, this effect could be more pronounced.

Examples 43-52

The production of large-aggregate fumed silica by introducing a feedstock downstream of the initial, fumed-silica-producing flame is demonstrated in Examples 43-52.

Various fumed silicas were produced using the same processes used to produce the fumed silicas of Examples 26-31 except as otherwise shown in Table 8. In the examples, the silica initially was produced using a premixed flame that burns chlorosilane feedstock, hydrogen, and air. A stream of fumed silica particles and combusted gas is thereby formed, which flowed down the reactor. A stream of additional feedstock, hydrogen, and air was introduced at a specific point downstream of the initial, silica-producing flame. The feedstock and hydrogen reacted upon introduction of the additional feedstock.

The mass-average aggregate size, surface area, surface area loss, and aggregate size increase for the resulting silicas are shown in Table 8. The phrase "surface area loss" refers to the amount (in m²/g) that the silica surface area falls as a result of the introduction of combustible gases, while the phrase "aggregate size increase" is the increase over the expected value for a conventional fumed silica of the same surface area as determined using line (b) in FIG. 1.

TABLE 8

| | | Example | | | | | | | | | |
|---|---|---|---|---|---|---|---|---|---|---|---|
| | | 43 | 44 | 45 | 46 | 47 | 48 | 49 | 50 | 51 | 52 |
| Process Variables | | | | | | | | | | | |
| Burner Adiabatic Temperature | °C. | 1761 | 1594 | 1763 | 1594 | 1768 | 1598 | 1766 | 1598 | 1880 | 1880 |
| Starting Surface Area | m²/g | 195 | 345 | 195 | 345 | 190 | 340 | 193 | 340 | 70 | 70 |
| % Feedstock Introduced Downstream | mass % | 20 | 20 | 35 | 35 | 20 | 20 | 35 | 35 | 35 | 35 |
| Introduced Theoretical $H_2$ Ratio | % | 60 | 60 | 60 | 60 | 120 | 120 | 120 | 120 | 60 | 60 |
| Introduced Theoretical $O_2$ Ratio | % | 284 | 284 | 163 | 163 | 149 | 149 | 85 | 85 | 161 | 80 |
| Introduction Position | $d_{reactor}$ | 7.5 | 7.5 | 7.5 | 7.5 | 7.5 | 7.5 | 7.5 | 7.5 | 7.0 | 7.0 |
| Resulting Fumed Silica | | | | | | | | | | | |
| Surface Area Loss | m²/g | −72 | 13 | −109 | −45 | 23 | 5 | 6 | 45 | −160 | −185 |
| Aggregate Size Increase | nm | 20 | 11 | 50 | 32 | 12 | 9 | 21 | 19 | 72 | 102 |
| Surface Area | m²/g | 267 | 332 | 304 | 390 | 167 | 335 | 187 | 295 | 228 | 255 |
| Aggregate Size | nm | 171 | 150 | 196 | 168 | 174 | 148 | 188 | 164 | 228 | 253 |

FIGS. 8-14 are TEM images of the fumed silica produced according to Examples 44, 45 (first sample), 45 (second sample), 47, 48, 50, and 52, respectively. As is apparent from FIGS. 9, 10, and 14, the fumed silica resulting from Examples 45 and 52 comprised aggregates of primary particles, wherein the primary particles have at least a bi-modal particle size distribution representing populations of primary particles having at least two different average primary particle sizes. In contrast, FIGS. 8, 11, 12, and 13 depict fumed silica comprising aggregates of primary particles that did not have at least a bi-modal particle size distribution. These results illustrate the importance of process variables in providing inventive fumed silicas of particular structures.

The results of Examples 43-52 illustrate the effects of the proportion of feedstock introduced downstream and introduced theoretical $H_2$ ratio, on the degree of aggregate size increase. Comparing examples at low relative feedstock introduction (Examples 43, 44, 47, and 48) with those at high relative feedstock introduction (Examples 45, 46, 49, 50, 51, and 52) demonstrates how increasing the relative amount of feedstock introduced in this range increases the degree of aggregate growth. Likewise, comparing low and high introduced theoretical $H_2$ ratio examples shows how a low value of this ratio promotes more aggregate growth than a high value, other conditions being the same. Similar comparisons demonstrate the influence of the starting surface area and introduction theoretical $H_2$ ratio on a surface area loss (or increase).

In contrast to the post-quench aggregate growth approach, the downstream introduction of feedstock can produce a silica whose aggregate size is larger than expected, but whose coefficient of structure is not larger than that in conventional fumed silicas. In FIG. 3 and FIG. 4, the open triangle point corresponds to Example 46. The fumed silica has a greatly increased aggregate size, yet its coefficient of structure resembles that of the conventional fumed silicas. By contrast, the larger aggregates of the post-quench aggregate growth process have larger coefficients of structure.

In addition to the process variables described above, it is believed that the temperature at the downstream point where the feedstock is introduced also affects the growth process. The position of downstream feedstock introduction, when it is between 3.3 and 8 $d_{reactor}$, has some influence on the aggregate growth and surface area change.

The relative amount of oxygen introduced with the feedstock may have a stronger impact on the amount of aggregate growth, when the introduced theoretical $H_2$ also is <100%, as suggested by the results of Examples 51 and 52. The relative amount of air introduced can be referred to as the "introduced theoretical oxygen." The ratio represents the amount of oxygen supplied with the introduced material divided by the amount stoichiometrically required to react all Si atoms in the feedstock to $SiO_2$, all carbon atoms to $CO_2$, and all remaining hydrogen atoms (not consumed to make HCl) to $H_2O$. In Example 52 where the ratio is lowered below 100%, and the introduction theoretical $H_2$ also is <100%, the largest aggregate among those of FIG. 2 is produced.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. Fumed silica comprising aggregates of primary particles, wherein the fumed silica has a surface area of from 100 to 300 m²/g, and wherein a 3 wt. % dispersion of the fumed silica in mineral oil has a power-law exponent index over a shear rate range of 0.1-5000 s⁻¹, of 0.8 or less.

2. The fumed silica of claim 1, wherein a 3 wt. % dispersion of the fumed silica in mineral oil has a power-law exponent index over a shear rate range of $0.1\text{-}5000\ s^{-1}$ of 0.1-0.8.

3. The fumed silica of claim 1, wherein the fumed silica has an aggregate size D as measured by PCS, in units of nm, and a surface area SA as measured by BET, in units of m²/g, satisfying the formula:

$$D > 151 + (5400/SA) + 0.00054(SA-349)^2.$$

4. The fumed silica of claim 3, wherein the fumed silica satisfies the formulas:

$$874 - 1.75(SA) \geq D \geq 291 - 0.58(SA),\ \text{where}\ 50 \leq SA \leq 200;$$

$$667 - 0.71(SA) \geq D \geq 222 - 0.24(SA),\ \text{where}\ 200 < SA \leq 255;$$

$$518 - 0.12(SA) \geq D \geq 173 - 0.04(SA),\ \text{where}\ 255 < SA \leq 425;\ \text{and}$$

$$346 + 0.28(SA) \geq D \geq 115 + 0.09(SA),\ \text{where}\ 425 < SA \leq 550.$$

5. The fumed silica of claim 4, wherein the fumed silica satisfies the formulas:

$$874 - 1.75(SA) \geq D \geq 291 - 0.58(SA),\ \text{where}\ 50 \leq SA \leq 200;$$

$$667 - 0.71(SA) \geq D \geq 222 - 0.24(SA),\ \text{where}\ 200 < SA \leq 255;$$

$$518 - 0.12(SA) \geq D \geq 173 - 0.04(SA),\ \text{where}\ 255 < SA \leq 425;\ \text{and}$$

$$346 + 0.28(SA) \geq D \geq 115 + 0.09(SA),\ \text{where}\ 425 < SA \leq 550.$$

6. The fumed silica of claim 4, wherein the fumed silica satisfies the formulas:

$$391 - 0.58(SA) \geq D \geq 306 - 0.58(SA),\ \text{where}\ 50 \leq SA \leq 200;$$

$$322 - 0.24(SA) \geq D \geq 237 - 0.24(SA),\ \text{where}\ 200 < SA \leq 255;$$

$$273 - 0.04(SA) \geq D \geq 188 - 0.04(SA),\ \text{where}\ 255 < SA \leq 425;\ \text{and}$$

$$215 + 0.09(SA) \geq D \geq 130 + 0.09(SA),\ \text{where}\ 425 < SA \leq 550.$$

7. The fumed silica of claim 1, wherein the fumed silica has a coefficient of structure $C_S > 58$ and an aggregate size $D > 120$ nm.

8. The fumed silica of claim 7, wherein the fumed silica has a coefficient of structure Cs satisfying the formula $58 < C_S < 90$, an aggregate size D satisfying the formula $120 < D < 300$, and a surface area SA satisfying the formula $50 < SA < 550$.

9. The fumed silica of claim 7, wherein the fumed silica has a coefficient of structure Cs satisfying the formula $58 < C_S < 90$, an aggregate size D satisfying the formula $120 < D < 300$, and a surface area SA satisfying the formula $100 < SA < 400$.

10. The fumed silica of claim 1, wherein a 3 wt. % dispersion of the fumed silica in mineral oil has a power-law exponent index over a shear rate range of $0.1\text{-}5000\ s^{-1}$ of 0.7 or less.

11. The fumed silica of claim 1, wherein a 3 wt. % dispersion of the fumed silica in mineral oil has a power-law exponent index over a shear rate range of $0.1\text{-}5000\ s^{-1}$ of 0.6 or less.

12. The fumed silica of claim 1, wherein a 3 wt. % dispersion of the fumed silica in mineral oil has a power-law exponent index over a shear rate range of $0.1\text{-}5000\ s^{-1}$ of 0.25-0.8.

13. The fumed silica of claim 1, wherein a 3 wt. % dispersion of the fumed silica in mineral oil has a power-law exponent index over a shear rate range of $0.1\text{-}5000\ s^{-1}$ of 0.3-0.8.

14. The fumed silica of claim 1, wherein a 3 wt. % dispersion of the fumed silica in mineral oil has a power-law exponent index over a shear rate range of $0.1\text{-}5000\ s^{-1}$ of 0.3-0.7.

15. The fumed silica of claim 1, wherein the primary particles have at least a bi-modal particle size distribution representing populations of primary particles having at least two different average primary particle sizes, and wherein the smallest average primary particle size is 0.05 to 0.4 times the largest average primary particle size.

16. The fumed silica of claim 15, wherein the smallest average primary particle size is 0.05 to 0.3 times the largest average primary particle size.

17. A chemical-mechanical polishing composition comprising the fumed silica of claim 15 dispersed in an aqueous medium.

18. The chemical-mechanical polishing composition of claim 17, wherein the composition further comprises an additive selected from the group consisting of oxidizing agents, surfactants, polymers, and mixtures thereof.

19. A process for producing fumed silica, which process comprises:
    (a) providing a stream of a feedstock comprising a silica precursor,
    (b) providing a stream of a combustible gas,
    (c) forming a stream of combusted gas with fumed silica particles suspended therein in a reactor, wherein the fumed silica particles comprise aggregates of primary particles, and wherein the aggregates are of a first aggregate size, by (c1) mixing the stream of the feedstock with the stream of the combustible gas to form a stream of combustible gas with the silica precursor, and then combusting the stream of combustible gas with the silica precursor to form the stream of combusted gas with fumed silica particles suspended therein, (c2) combusting the stream of combustible gas to form a stream of combusted gas and then mixing the stream of the feedstock with the stream of the combusted gas to form a stream of combusted gas with the silica precursor suspended therein, which then forms fumed silica particles, or (c3) carrying out a combination of the foregoing items (c1) and (c2), (d) allowing contact among the fumed silica particles having the first aggregate size in the stream of combusted gas and either (d1) contacting the fumed silica particles having the first aggregate size with one or more dopants to modify surfaces thereof, (d2) controlling the temperature-time profile of the fumed silica particles having the first aggregate size to allow post-quench aggregate growth, (d3) introducing additional feedstock into the stream of combusted gas with the fumed silica particles having the first aggregate size suspended therein, or (d4) carrying out a combination of any of the foregoing items (d1), (d2), and (d3), thereby forming a stream of combusted gas with fumed silica particles suspended therein, wherein the fumed silica particles comprise aggregates of a second aggregate size larger than the first aggregate size, and (e) recovering the fumed silica particles having the second aggregate size from the stream of combusted gas, wherein the recovered fumed silica particles have a surface area of from 100 to 300 m²/g, wherein a 3 wt. % dispersion of the recovered fumed silica particles in mineral oil has a power-law exponent index over a shear rate range of 0.1-5000 s⁻¹, of 0.8 or less, and wherein the recovered fumed silica particles have an aggregate size D as measured by PCS, in units of nm, and a surface area SA as measured by BET, in units of m²/g, satisfying the formula:

$$D \geqq 151+(5400/SA)+0.00054(SA-349)^2.$$

20. The process of claim 19, wherein combusting the stream of combustible gas results in a flame having an adiabatic flame temperature of 1000° C. to 2200° C.

21. The process of claim 19, wherein the fumed silica particles having the first aggregate size are contacted with one or more dopants in a manner such that fusion between the fumed silica particles having the first aggregate size is promoted to provide the fumed silica particles having the second aggregate size.

22. The process of claim 21, wherein the one or more dopants are fed to a flame resulting from the combustion of the combustible gas.

23. The process of claim 21, wherein the one or more dopants are fed into the stream of combusted gas.

24. The process of claim 23, wherein the one or more dopants are fed into the stream of combusted gas at a distance of 1 to 10 times the reactor characteristic diameter downstream of a flame resulting from the combustion of the combustible gas.

25. The process of claim 21, wherein the dopants comprise compounds of at least one element selected from the group consisting of Group IA elements, Group IIA elements, Group IVB elements, and Group IIIA elements.

26. The process of claim 21, wherein the dopants are fed into the stream of combustible gas or the stream of combusted gas in an amount of 1 ppm to 100,000 ppm, based on the weight of the fumed silica.

27. The process of claim 19, wherein the temperature-time profile of the fumed silica particles having the first aggregate size is controlled to allow post-quench aggregate growth.

28. The process of claim 27, wherein the stream of combusted gas with fumed silica particles having the first aggregate size suspended therein is cooled to below 1700° C., and thereafter at least one of use of refractory insulation in the reactor, active heating of reactor, introduction of additional combustible gas, and introduction of cooling gas or liquid is used to maintain a temperature of the stream of combusted gas with the fumed silica particles having the first aggregate size suspended therein sufficiently high to allow aggregates to fuse together to form the fumed silica particles having the second aggregate size.

29. The process of claim 28, which process comprises introducing additional combustible gas into the stream of combusted gas.

30. The process of claim 29, wherein the introduction of the additional combustible gas raises an adiabatic temperature of the stream of combusted gas with the fumed silica particles having the first aggregate size suspended therein by at least 100° C., which increased adiabatic temperature is maintained for up to 2 seconds.

31. The process of claim 29, wherein the additional combustible gas is fed into the stream of combusted gas at a distance of 1 to 10 times a characteristic transverse dimension of the reactor downstream of a flame resulting from the combustion of the combustible gas.

32. The process of claim 29, wherein the additional combustible gas is fed into the stream of combusted gas in an amount of 1% to 100% of a total mass of material in the stream of combusted gas.

33. The process of claim 29, wherein the additional combustible gas comprises fuel, oxidant, and diluent, and a stoichiometric ratio of oxidant to fuel is between 0% and 300%.

34. The process of claim 33, wherein the temperature of the stream of combusted gas with the fumed silica particles having the first aggregate size suspended therein is maintained at or above approximately 1000° C. for up to 2 seconds to allow aggregates to fuse together to form the fumed silica particles having the second aggregate size.

35. The process of claim 19, wherein the additional feedstock is introduced into the stream of combusted gas with the fumed silica particles suspended therein.

36. The process of claim 35, wherein the additional feedstock introduced is 10-50% of a total feedstock on a mass basis.

37. The process of claim 35, wherein the additional feedstock is introduced along with the combustible gas.

38. The process of claim 35, wherein the additional feedstock is fed into the stream of combusted gas at a distance of 1 to 10 times a characteristic transverse dimension of the reactor downstream of a flame resulting from the combustion of the combustible gas.

* * * * *